United States Patent
Ishige et al.

(10) Patent No.: US 10,099,380 B2
(45) Date of Patent: Oct. 16, 2018

(54) ROBOT, ROBOT CONTROL DEVICE, AND ROBOT SYSTEM

(71) Applicant: Seiko Epson Corporation, Tokyo (JP)

(72) Inventors: Taro Ishige, Matsumoto (JP); Atsushi Harada, Matsumoto (JP); Yukihiro Yamaguchi, Matsumoto (JP)

(73) Assignee: Seiko Epson Corporation (JP)

( * ) Notice: Subject to any disclaimer, the term of this patent is extended or adjusted under 35 U.S.C. 154(b) by 59 days.

(21) Appl. No.: 15/157,658

(22) Filed: May 18, 2016

(65) Prior Publication Data

US 2016/0354929 A1  Dec. 8, 2016

(30) Foreign Application Priority Data

Jun. 2, 2015 (JP) ................................. 2015-111972

(51) Int. Cl.
G05B 19/04 (2006.01)
B25J 9/16 (2006.01)

(52) U.S. Cl.
CPC .......... *B25J 9/1697* (2013.01); *B25J 9/1692* (2013.01); *G05B 2219/39022* (2013.01)

(58) Field of Classification Search
CPC .............. B25J 9/1692; B25J 9/1697; G05B 2219/39022; G06T 2207/30244; G06T 7/002; G06T 7/004; Y10S 901/09
See application file for complete search history.

(56) References Cited

U.S. PATENT DOCUMENTS

| | | | | |
|---|---|---|---|---|
| 5,198,876 A * | 3/1993 | Anezaki | ................. | B25J 9/1697 348/141 |
| 5,308,221 A * | 5/1994 | Shimokoshi | ........... | B25J 9/1612 414/730 |
| 5,673,082 A * | 9/1997 | Wells | ...................... | G01S 7/493 348/139 |
| 6,044,308 A * | 3/2000 | Huissoon | ............... | B25J 9/1692 700/166 |
| 6,681,151 B1 * | 1/2004 | Weinzimmer | ......... | B25J 9/1697 219/121.85 |
| 7,084,900 B1 * | 8/2006 | Watanabe | ............ | G06K 9/6203 348/94 |
| 7,200,260 B1 * | 4/2007 | Watanabe | .............. | B25J 9/1692 382/103 |
| 8,180,487 B1 * | 5/2012 | Vangal-Ramamurthy | ................... | B25J 9/1692 219/121.78 |
| 9,050,728 B2 * | 6/2015 | Ban | ........................ | B25J 9/1697 |
| 9,616,573 B2 * | 4/2017 | Kawamura | ............ | B25J 9/1697 |
| 9,833,897 B2 * | 12/2017 | Soe-Knudsen | ........ | B25J 9/0081 |
| 9,924,626 B2 * | 3/2018 | McCarty, II | ............. | A01C 1/00 |

(Continued)

FOREIGN PATENT DOCUMENTS

JP  2012-228757 A  11/2012

*Primary Examiner* — Khoi H Tran
*Assistant Examiner* — Jorge O Peche
(74) *Attorney, Agent, or Firm* — Harness, Dickey & Pierce, P.L.C.

(57) ABSTRACT

A robot includes: a local coordinate system deriving portion which derives a local coordinate system having two shafts which are parallel to a work plane and orthogonal to each other, based on an image in which markers illustrating three or more points on the work plane which is not horizontal are captured; and a control parameter obtaining portion which obtains control parameters via the local coordinate system.

7 Claims, 16 Drawing Sheets

(56) References Cited

U.S. PATENT DOCUMENTS

| | | | | |
|---|---|---|---|---|
| 9,980,424 B2* | 5/2018 | McCarty, II | | A01C 1/00 |
| 2003/0078694 A1* | 4/2003 | Watanabe | | B25J 9/1697 |
| | | | | 700/245 |
| 2004/0172164 A1* | 9/2004 | Habibi | | B25J 9/1692 |
| | | | | 700/245 |
| 2005/0065653 A1* | 3/2005 | Ban | | B25J 9/1697 |
| | | | | 700/245 |
| 2005/0131582 A1* | 6/2005 | Kazi | | B25J 9/1697 |
| | | | | 700/259 |
| 2005/0159842 A1* | 7/2005 | Ban | | B25J 19/023 |
| | | | | 700/245 |
| 2005/0270375 A1* | 12/2005 | Poulin | | G01B 11/2504 |
| | | | | 348/187 |
| 2007/0025612 A1* | 2/2007 | Iwasaki | | G01B 11/25 |
| | | | | 382/154 |
| 2007/0177790 A1* | 8/2007 | Ban | | B25J 9/1697 |
| | | | | 382/153 |
| 2008/0004750 A1* | 1/2008 | Ban | | B25J 9/1692 |
| | | | | 700/245 |
| 2008/0027580 A1* | 1/2008 | Zhang | | B25J 9/1633 |
| | | | | 700/245 |
| 2009/0234502 A1* | 9/2009 | Ueyama | | B25J 9/1697 |
| | | | | 700/259 |
| 2010/0274390 A1* | 10/2010 | Walser | | B25J 9/1697 |
| | | | | 700/259 |
| 2011/0029131 A1* | 2/2011 | Ban | | B25J 9/1697 |
| | | | | 700/254 |
| 2012/0323357 A1* | 12/2012 | Izumi | | B25J 9/1697 |
| | | | | 700/228 |
| 2013/0079928 A1* | 3/2013 | Soe-Knudsen | | B25J 9/1656 |
| | | | | 700/248 |
| 2015/0158181 A1* | 6/2015 | Kawamura | | B25J 9/1697 |
| | | | | 700/259 |
| 2015/0224649 A1* | 8/2015 | Watanabe | | B25J 9/1607 |
| | | | | 700/259 |
| 2016/0151915 A1* | 6/2016 | Nishi | | B25J 9/1692 |
| | | | | 700/247 |
| 2016/0223316 A1* | 8/2016 | Jordil | | G01B 11/005 |
| 2016/0229062 A1* | 8/2016 | Suzuki | | B25J 9/1697 |
| 2017/0066131 A1* | 3/2017 | Kamikawa | | B25J 9/1692 |
| 2017/0095930 A1* | 4/2017 | Warashina | | B25J 9/1664 |
| 2017/0136626 A1* | 5/2017 | Wang | | B25J 9/1692 |
| 2017/0151671 A1* | 6/2017 | Ishige | | B25J 9/1692 |
| 2017/0182665 A1* | 6/2017 | Okuyama | | B25J 9/1697 |
| 2018/0004188 A1* | 1/2018 | Yamaguchi | | G05B 19/4086 |
| 2018/0024521 A1* | 1/2018 | Matsuura | | G05B 19/0426 |

* cited by examiner

ROBOT, ROBOT CONTROL DEVICE, AND ROBOT SYSTEM

BACKGROUND

1. Technical Field

The present invention relates to a robot, a robot control device, and a robot system.

2. Related Art

In the related art, when processing a workpiece using a robot, it is necessary to teach a position of the workpiece or a posture of a tool with respect to the workpiece in advance. Here, the tool is a hand or the like which is used for processing the workpiece, and is an attachment which is mounted on the robot in accordance with a state of the workpiece and the content of the processing. In a case where the position of the workpiece or the posture of the tool with respect to the workpiece is taught to the robot, a method for moving a control object point of a tip end or the like of the tool to a target point using the practical position of the workpiece as a target point by a jog feeding operation, and for storing the position after the movement in the robot, is generally employed.

JP-A-2012-228757 is an example of the related art.

However, an object surface of the workpiece processed by the robot is not necessarily a horizontal surface (a surface perpendicular to the vertical direction). For example, if processing of forming a plurality of holes by one drill of a side surface of the workpiece having a shape of a triangular prism is employed, when the workpiece is loaded on a horizontal work bench considering the other side surface as a bottom surface, the object surface on which the holes are formed becomes an inclined surface which is not horizontal. In this case, a punching position which is on the inclined object surface and a posture in which the rotation axis of the drill becomes perpendicular to the object surface, are taught. However, such teaching work is not easy, and it is difficult to perform the work with high accuracy.

SUMMARY

An advantage of some aspects of the invention is to easily control a robot based on a plane which is not horizontal.

A robot according to an aspect of the invention includes: a local coordinate system deriving portion which derives a local coordinate system having two shafts which are parallel to a work plane and orthogonal to each other, based on an image in which markers illustrating three or more points on the work plane which is not horizontal are captured; and a control parameter obtaining portion which obtains control parameters via the local coordinate system.

Here, the work plane is a plane which becomes a reference when the robot controls the workpiece, and is a plane which becomes a reference when performing various types of processing to the workpiece, such as a surface on which the workpiece processed by the robot is loaded, an object surface of the workpiece, or a plane parallel thereto. In addition, the deriving of the local coordinate system is making a corresponding relationship between a position illustrated by a reference coordinate system defined in advance and a position illustrated by the local coordinate system clear, and for example, deriving of a coordinate conversion matrix. In addition, the control parameters are numerical values illustrating control amounts of the position, the direction, the posture, the distance, the speed, the acceleration, the angular speed, and the angular acceleration, which are used when controlling the robot. Therefore, "obtaining the control parameters via the local coordinate system" means that the control parameters are obtained in a state where geometric implications of the numeric values (control parameters) by the local coordinate system are interpreted. In addition, the control parameters may not illustrate the coordinate or the direction of the local coordinate system, and for example, the coordinate or the direction of the local coordinate system may be obtained by using the conversion matrix after the coordinate or the direction of another coordinate system which corresponds to the local coordinate system is obtained by an external system or an input operation of an operator as the control parameters, and the coordinate or the direction of another coordinate system may be obtained by using the conversion matrix after the coordinate or the direction of the local coordinate system is obtained by the external system or the input operation of the operator.

According to the aspect of the invention, since the local coordinate system is derived based on the image, and the control parameters can be obtained by the robot via the derived local coordinate system, it becomes easy to control the robot based on the plane which is not horizontal.

In addition, functions of each unit described in the aspect are realized by hardware resources of which a function is specified by the configuration itself, hardware resources of which a function is specified by a program, or combination of the resources. In addition, the functions of each unit are not limited to the functions realized by the hardware resources each of which is physically separated from each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
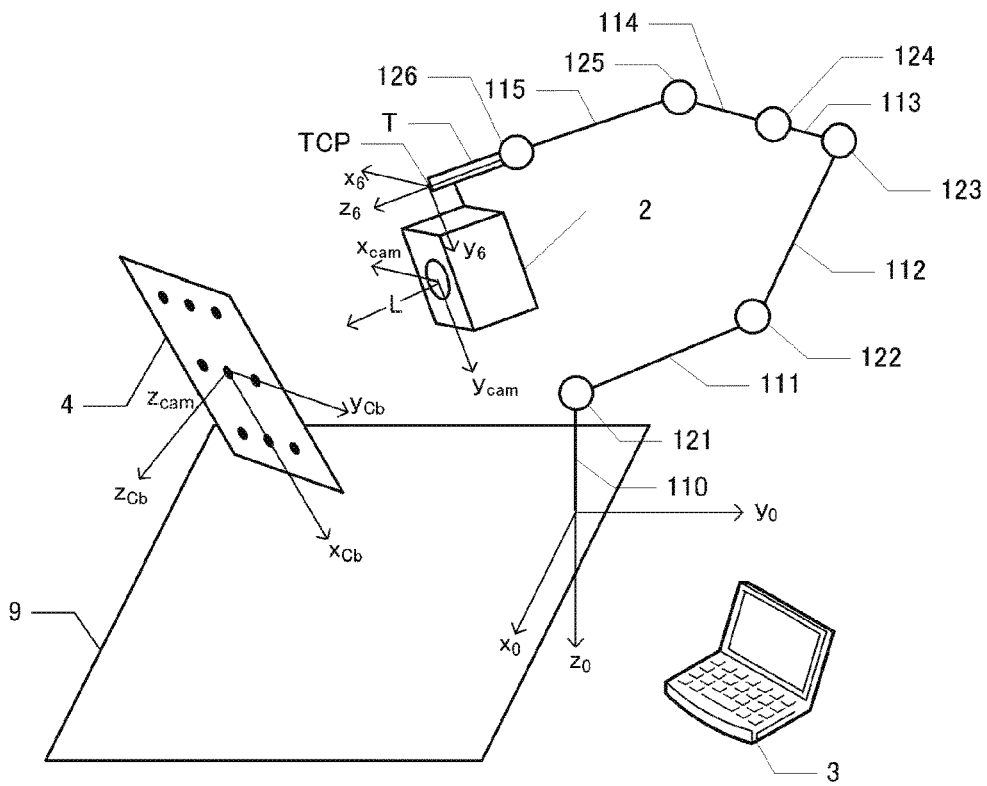
FIG. 1A is a schematic perspective view according to an embodiment of the invention.

Hereinafter, an embodiment of the invention will be described with reference to the attached drawings. Furthermore, configuration elements which correspond to each drawing will be given the same reference numerals, and overlapped description will be omitted.

1. Configuration of Robot System

Figure 1B:
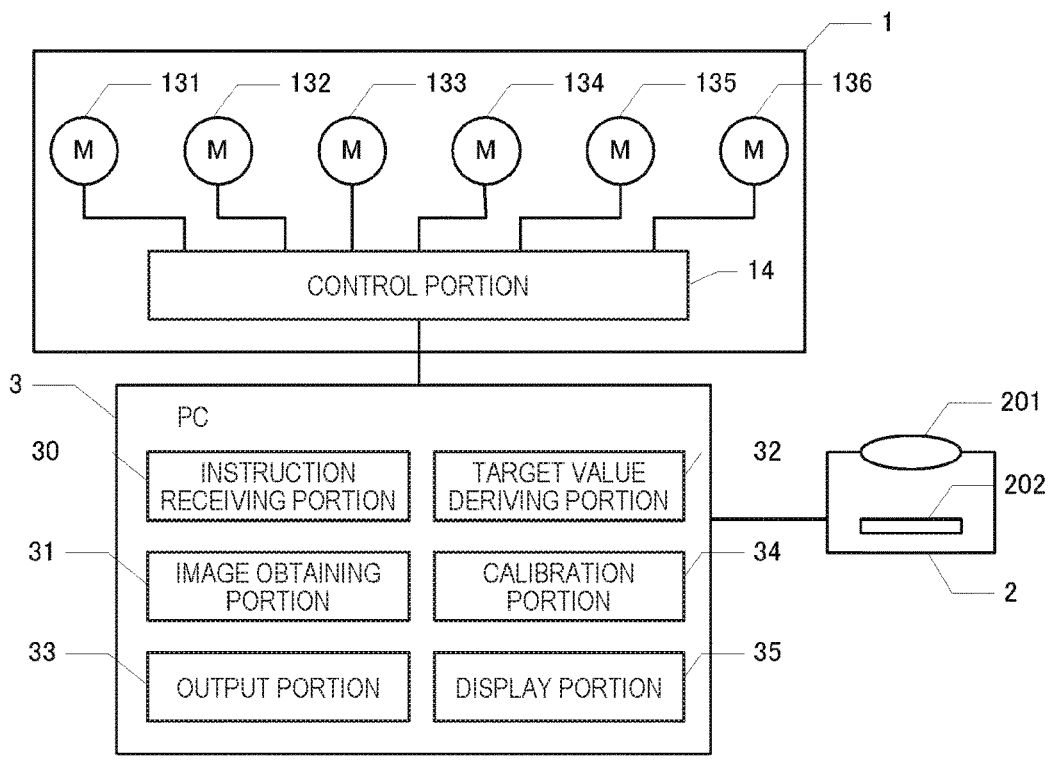
FIG. 1B is a block diagram according to the embodiment of the invention.

As illustrated in FIGS. 1A and 1B, a robot system which is an example of the invention includes a robot 1, a camera 2, and a personal computer (PC) 3 which is a robot control device.

As simply illustrated in FIG. 1A, the robot 1 is a single arm 6-shaft robot provided with a manipulator which is curved by six rotation axis members 121, 122, 123, 124, 125, and 126. A base 110 supports the rotation axis member 121 of a first arm 111. The first arm 111 rotates with respect to the base 110 together with the rotation axis member 121 around a center axis of the rotation axis member 121. The first arm 111 supports the rotation axis member 122 of a second arm 112. The second arm 112 rotates with respect to the first arm 111 together with the rotation axis member 122 around a center axis of the rotation axis member 122. The second arm 112 supports the rotation axis member 123 of a third arm 113. The third arm 113 rotates with respect to the second arm 112 together with the rotation axis member 123 around a center axis of the rotation axis member 123. The third arm 113 supports the rotation axis member 124 of a fourth arm 114. The fourth arm 114 rotates with respect to the third arm 113 together with the rotation axis member 124 around a center axis of the rotation axis member 124. The fourth arm 114 supports the rotation axis member 125 of a fifth arm 115. The fifth arm 115 rotates with respect to the fourth arm 114 together with the rotation axis member 125 around a center axis of the rotation axis member 125. The fifth arm 115 supports the rotation axis member 126 on which a tool is mounted.

Figure 2A:
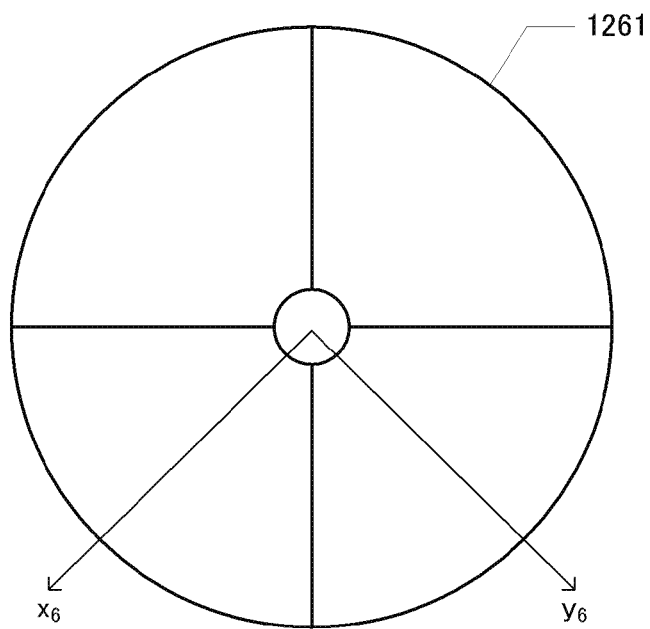
FIG. 2A is a plan view according to the embodiment of the invention.
Figure 2B:
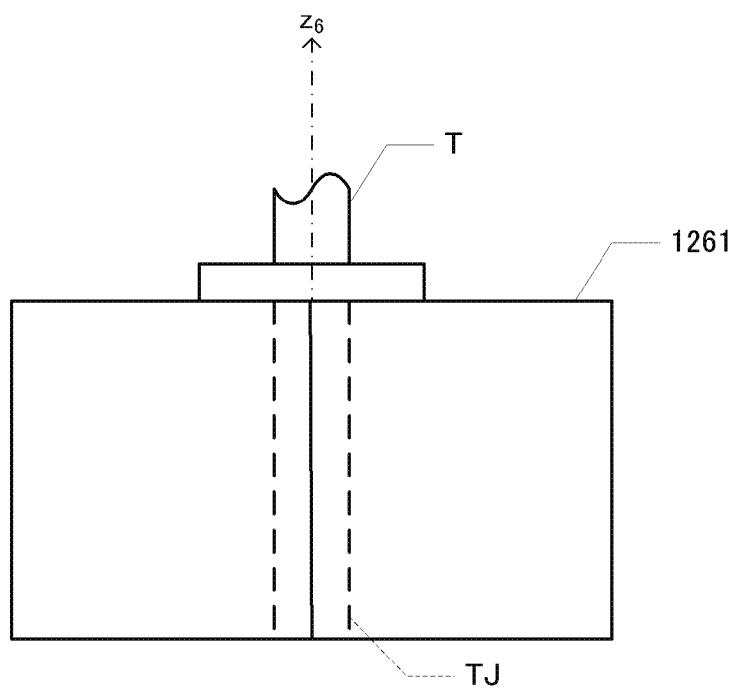
FIG. 2B is a side view according to the embodiment of the invention.

As illustrated in FIGS. 2A and 2B, in the rotation axis member 126 of a tip end, a tool chuck 1261 on which various tools for operating the workpiece are mounted is provided. As illustrated in FIG. 2A, an attachment surface of the tool chuck 1261 is divided in a radial shape, and a rod-shaped shaft portion TJ of the tool is mounted on the center portion thereof. The tool chuck 1261 nips and holds the shaft portion TJ of various tools on a rotation axis of the rotation axis member 126. Therefore, in a state where the tool is correctly mounted on the tool chuck 1261, the center shaft of the shaft portion TJ of the tool matches the rotation axis of the rotation axis member 126. Here, when gripping the workpiece by using the robot 1, a reference point on the robot 1 side at the part closest to an object, such as a part which becomes a contact point between the robot 1 and the workpiece, is generally called a tool center point (TCP). In the example, the TCP becomes a control object point.

As illustrated in FIG. 1B, the robot 1 includes a motor 131 which drives the rotation axis member 121, a motor 132 which drives the rotation axis member 122, a motor 133 which drives the rotation axis member 123, a motor 134 which drives the rotation axis member 124, a motor 135 which drives the rotation axis member 125, a motor 136 which drives the rotation axis member 126, and a control portion 14 which controls the motors 131 to 136. The motors 131 to 136 are servomotors which are feedback-controlled so that a difference between a target value and a current value becomes zero. The control portion 14 obtains the target value illustrating a position of the TCP and a posture, or a jog feeding instruction from the PC 3, and controls the motors 131 to 136 based on the target value and the jog feeding instruction.

When controlling the robot 1, in addition to a reference coordinate system Rb which becomes a reference of the entire coordinate system, coordinate systems J1 to J6 which are fixed to each rotation axis member and rotate with each rotation axis member, and a local coordinate system Lc which is used when processing a specific workpiece by using robot vision, are used. A unit of the length of the coordinate systems is millimeters, and a unit of an angle is degrees. The reference coordinate system Rb of the robot 1 is a three-dimensional orthogonal coordinate system which is determined by an $x_0$-axis and a $y_0$-axis which are horizontal to each other, and a $z_0$-axis which considers the vertically downward direction as the forward direction, and is fixed to a space in which the robot 1 operates by installing the robot 1. The coordinate system J6 which rotates with the rotation axis member 126 is a three-dimensional orthogonal coordinate system which considers the TCP as an origin point and is determined by a $z_6$-axis parallel to the rotation axis of the rotation axis member 126, and an $x_6$-axis and a $y_6$-axis which are orthogonal to the $z_6$-axis. In addition, the rotation around a z-axis of each coordinate system is illustrated as u, the rotation around a y-axis is illustrated as v, and the rotation around an x-axis is illustrated as w.

An extending chuck T for attaching the camera 2 and an arbitrary tool is fixed to the tool chuck 1261. The camera 2 which serves as a capturing portion is fixed to the extending chuck T so that an optical axis L becomes parallel to the rotation axis of the rotation axis member 126. The camera 2 is a capturing device which includes a lens 201, an area image sensor 202, and an AD converter or the like which is not illustrated, for recognizing the size, the shape, the position, and the posture of the workpiece on the work plane. In addition, in the example, the calibrated robot vision is two-dimensional robot vision which considers the work plane determined in advance as an object. Therefore, in the lens 201, it is preferable to use a single focus lens in which an F value having a shallow depth of field (long focal length) is small.

A camera coordinate system Cam is defined in order to define the position and the posture of the camera 2. As illustrated in FIG. 1A, the camera coordinate system Cam is a three-dimensional orthogonal coordinate system which considers a capturing position as an original point, includes a $z_{Cam}$-axis which corresponds to the optical axis L, an $x_{Cam}$-axis which corresponds to the horizontal direction of the area image sensor 202, and a $y_{Cam}$-axis which corresponds to the vertical direction of the area image sensor 202, and is fixed to the J6 coordinate system. The capturing position is an intersection point of the optical axis L and the area image sensor 202. The camera coordinate system Cam is defined by camera setting in which the capturing positions $(x_6, y_6, z_6)$ in the J6 coordinate system fixed to the rotation axis member 126, and the postures $(u_6, v_6, w_6)$ of the camera coordinate system Cam in the J6 coordinate system, are components. The posture of the camera coordinate system Cam illustrates how many degrees the camera coordinate system Cam rotates around each shaft of the J6 coordinate system.

The coordinate system of an image output from the camera 2 is called an image coordinate system Im. A unit of the length of the image coordinate system Im is pixels, and a unit of an angle is degrees. As the image coordinate system Im and the reference coordinate system Rb are associated with each other, it is possible to image-recognize the position, the posture, and the shape of the workpiece on the work plane. Therefore, in order to recognize the position or the like of the workpiece based on the image output by the camera 2, and to control the robot 1 based on the recognition result, processing of associating the image coordinate system Im and the reference coordinate system Rb with each other, that is, the calibration, becomes necessary. The relationship between the image coordinate system Im and the reference coordinate system Rb is determined in accordance with the optical characteristics (focal length, distortion, or the like) of the lens 201, and the pixel number and the size of the area image sensor 202. In the calibration, the conversion matrix which illustrates the non-linear corresponding relationship between the reference coordinate system Rb and the image coordinate system Im is obtained.

However, in a case where the work plane is not horizontal, it is easier to control or operate the robot 1 via the coordinate system having two shafts parallel to the work plane, than to control or operate the robot 1 via the reference coordinate system Rb in which an $x_0 y_0$ plane is horizontal. Here, in the example, a local coordinate system Lc having two shafts parallel to the work plane which makes an arbitrary angle with the horizontal surface, is defined as follows.

The local coordinate system Lc is a three-dimensional orthogonal coordinate system which considers a viewpoint (capturing position) of the robot vision as an original point, includes a $z_{Lc}$-axis which is perpendicular to the work plane and parallel to the optical axis L of the camera 2, an $x_{Lc}$-axis which is parallel to the work plane, perpendicular to the optical axis L of the camera 2, and parallel to a horizontal axis of the image coordinate system, and a $y_{Lc}$-axis which is parallel to the work plane, perpendicular to the optical axis L of the camera 2, and parallel to a perpendicular axis of the image coordinate system, and is fixed to the reference coordinate system Rb. In other words, the local coordinate system Lc is set each time with respect to the work plane by the capturing position illustrated by the reference coordinate system Rb, a capturing posture, and the camera setting. Therefore, when the camera setting is not performed correctly, it is not possible to set the local coordinate system Lc as defined, and it is not possible to control the robot 1 via the local coordinate system Lc as intended. In the camera setting, in addition to the position and the posture of the camera 2, information based on the focal length, a main point, the distortion or the like of the lens 201, and the optical characteristics of the lens 201, are included. Since the focal length, the main point, or the distortion is unchangeable in the camera 2, the camera setting based on the optical characteristics of the lens 201 uses a value determined in advance.

The PC 3 which serves as a robot control device is connected to the robot 1 and the camera 2 to be able to communicate. In the PC 3, various computer programs, such as a calibration program for setting the local coordinate system Lc and calibrating the reference coordinate system Rb and the image coordinate system Im, a tool set program for setting an offset of the camera 2 and the tool with respect to the TCP, or a teaching program, are installed. The PC 3 is a computer provided with a processor which is not illustrated, a main storage which is not illustrated and configured of a DRAM, an input/output mechanism which is not illustrated, an external storage which is not illustrated and configured of a nonvolatile memory, and a keyboard. In addition, the PC 3 is provided with a display portion 35 which has a screen for displaying the image captured by the camera 2 or a GUI. The PC 3 functions as an instruction receiving portion 30, an image obtaining portion 31, a target value deriving portion 32, an output portion 33, and a calibration portion 34, by executing the program stored in the external storage by the processor.

The instruction receiving portion 30 displays the image captured by the camera 2 or the GUI on the screen of the display portion 35. In addition, the instruction receiving portion 30 receives a start instruction of various types of processing, and obtains control parameters, such as a target position or a target posture, via the GUI. In other words, the instruction receiving portion functions as a control parameter obtaining portion.

Figure 3:
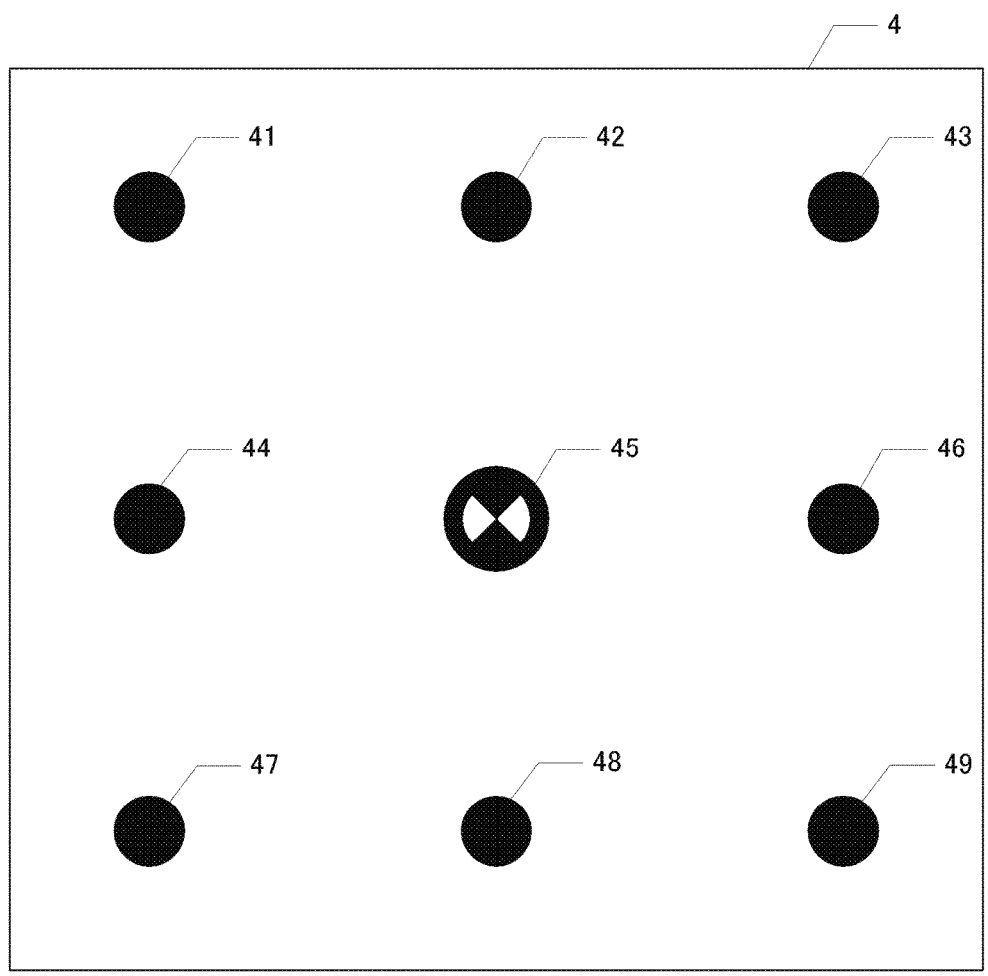
FIG. 3 is a plan view according to the embodiment of the invention.

The image obtaining portion 31 instructs the capturing to the camera 2, and obtains an image in which markers illustrating reference points included in the work plane are captured from the camera 2 in accordance with the instruction. In the example, in order to visualize the work plane, a marker board 4 illustrated in FIGS. 1A and 3 is used. As illustrated in FIG. 3, the marker board 4 is a plate on which nine markers 41 to 49 having a circular outline are marked to predetermined lattice points on a flat surface. The centers of each of the markers 41 to 49 correspond to reference points. The center positions of each of the markers 41 to 49 on the marker board 4 are held by the PC 3 in two-dimensional coordinate systems (marker coordinate system Cb) fixed to the marker board 4. In addition, the markers may be in an aspect in which the reference points can be specified by detecting the markers from the captured image. In other words, an aspect in which the position of a certain point can be geometrically defined with respect to a figure of the marker, may be employed. A point separated from the marker may be defined as a reference point, a plurality of reference points from one marker may be defined, or one reference point may be defined by a plurality of markers separated from each other. In addition, since it may be possible to specify a plane by the markers, the number of reference points indicated by the marker may be three or more.

The target value deriving portion 32 derives the target value for changing a positional relationship between the camera 2 and the markers 41 to 49 to a state determined in advance, based on the image captured by the camera 2. Specifically, the target value deriving portion 32 derives the target value of the TCP which corresponds to the state determined in advance, based on the image captured by the camera 2. The target value deriving portion 32 performs coordinate conversion from the image coordinate system Im to the local coordinate system Lc, or coordinate conversion from the local coordinate system Lc to the reference coordinate system Rb, in the process of deriving the target value. In addition, the target value deriving portion 32 sets the local coordinate system Lc by deriving a conversion matrix $^{Rb}R_{Lc}$ which determines the corresponding relationship between the reference coordinate system Rb and the local coordinate system Lc, based on the image captured by the camera 2, the position and the posture of the TCP, and the camera setting. In other words, the target value deriving portion 32 functions as a local coordinate system deriving portion.

The calibration portion 34 derives a conversion matrix $^{Im}R_{Rb}$ which determines the corresponding relationship between the image coordinate system Im and the reference coordinate system Rb. The calibration portion 34 derives the conversion matrix $^{Im}R_{Rb}$ after the positional relationship between the camera 2 and the markers 41 to 49 (reference points P1 to P9) is determined in the following perpendicular state and a focus state of which the target values corresponding to each state are derived by the target value deriving portion 32.

Perpendicular state: a state where the optical axis of the marker board 4 and the camera 2 are perpendicular.

Focus state: a state where the camera 2 focuses on the marker board 4.

The focus state is determined by sharpness of the image which is an index of focus. In addition, in the example, a state where the sharpness of a region (partial image) determined in advance in the image is the maximum is the focus state, but any width may be employed in the focus state by providing a threshold value to the index of focus.

The output portion 33 operates the robot 1 by outputting the target value derived by the target value deriving portion 32 to the control portion 14 of the robot 1.

2. Automatic Camera Setting

Figure 4:
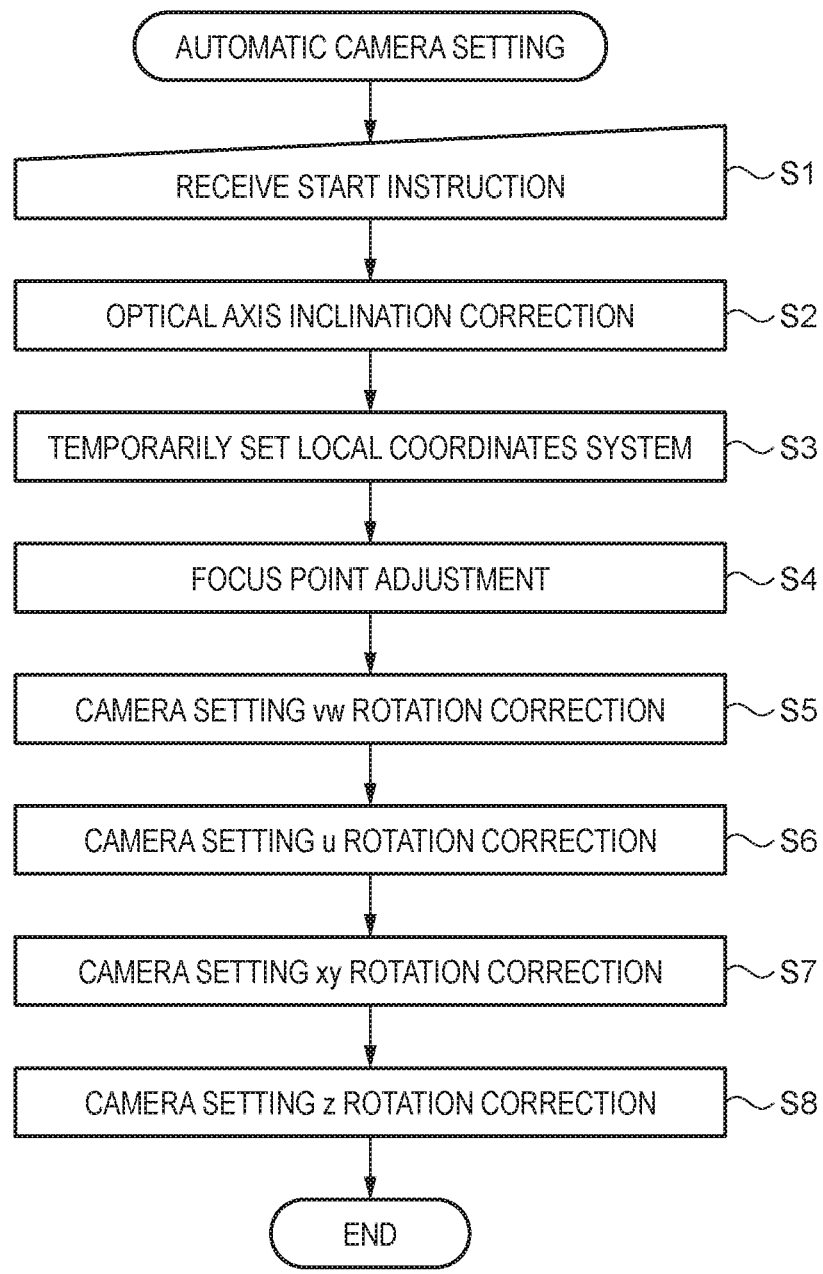
FIG. 4 is a flowchart according to the embodiment of the invention.

Next, an automatic camera setting will be described with reference to FIG. 4. The automatic camera setting is processing of automatically setting the capturing position and the capturing posture as the camera setting. The automatic camera setting is initiated as an operator inputs the start instruction to the PC 3. After this, the process may be completed without necessity of any operation of the operator. The start instruction is a trigger for starting the automatic camera setting. Therefore, the target value for operating the robot 1 may not be included. The only request for the operator before inputting the start instruction may be the installation of the marker board 4 at an arbitrary position and posture, and the jog feeding operation which moves the TCP in a state where the marker board 4 can be captured from a substantially front view by the camera 2.

When the start instruction is input to the PC 3 (S1), the PC 3 performs optical axis inclination calibration which makes the optical axis of the camera 2 perpendicular to the marker board 4 based on the image (S2). In the inclination calibration, the image of the marker board 4 is captured by the camera 2, and the markers 41 to 49 which illustrates nine reference points are detected by the image coordinate system Im. In addition, based on the detection result, the marker board 4 and the optical axis of and the camera 2 become perpendicular to each other, the target value for positioning the central marker 45 at the gravity center of the image is derived, and the arms 111 to 115 move. At this point, since the focal point of the camera 2 is not focused on the marker board 4, a low-accuracy perpendicular state where the marker board 4 and the optical axis L of the camera 2 are substantially perpendicular to each other, and the gravity center of the marker 45 and the gravity center of the image substantially match each other, is achieved. This will be described in detail later.

In the low-accuracy perpendicular state, the PC 3 performs a temporary setting of the local coordinate system Lc (S3). Specifically, the provisional conversion matrix $^{Rb}R_{Lc}$ is derived based on rotation angles of the rotation axis members 121 to 125 and the camera setting. The low-accuracy perpendicular setting is set based on the image captured by the camera 2, but on a stage where the calibration of the image coordinate system Im and the reference coordinate system Rb is not completed, and the camera setting is also not corrected, a $z_{Lc}$-axis of the local coordinate system Lc which is set based on the rotation angles of the rotation axis members 121 to 125 and the camera setting does not become parallel to the optical axis L of the camera 2, the $x_{Lc}$-axis of the local coordinate system Lc does not become parallel to the horizontal direction of the area image sensor 202, and the $y_{Lc}$-axis of the local coordinate system Lc does not become parallel to the perpendicular direction of the area image sensor 202.

Next, the PC 3 performs focal point adjustment (S4). In the focal point adjustment, the marker board 4 is repeatedly captured by the camera 2 while moving the camera 2 in the direction parallel to the $z_{Lc}$-axis of the local coordinate system Lc, and the focus state where the sharpness of the markers 41 to 49 reflected on the image becomes the maximum is searched. Furthermore, the PC 3 derives the target value for achieving the focus state based on the search result, outputs the derived target value to the robot 1, moves the arms 111 to 115, and achieves the focus state. This will be described in detail later.

Next, in order to make the $z_{Lc}$-axis direction of the local coordinate system Lc and the optical axis L of the camera 2 parallel to each other, based on the image captured by the camera 2, the PC 3 corrects a v component (a rotation component around a $y_6$-axis) and a w component (a rotation component around an $x_6$-axis) of the camera setting, and updates the local coordinate system Lc (S5). This will be described in detail as follows.

Figure 9:
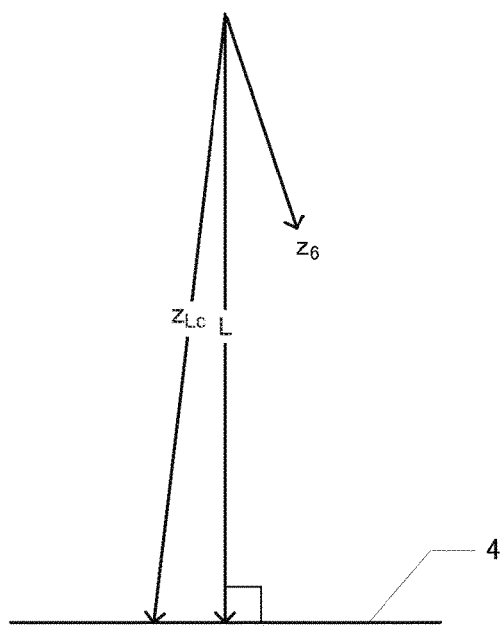
FIG. 9 is a schematic view according to the embodiment of the invention.

Since the $z_{Lc}$-axis direction illustrating the direction of the optical axis L in the reference coordinate system Rb is uniquely associated with the capturing postures (u, v, w) of the camera setting and the rotation angles of the rotation axis members 121 to 126, in a case where the capturing posture of the camera 2 stored as the camera setting and the practical capturing posture of the camera 2 attached to the fifth arm 115 are different from each other, the $z_{Lc}$-axis direction of the local coordinate system Lc is deviated from the direction of the practical optical axis L. For example, in a case where the capturing posture of the camera setting is not correct, as illustrated in FIG. 9, the $z_{Lc}$-axis direction of the local coordinate system Lc, which is derived from the posture ($z_6$-axis direction) of the TCP in a state where the optical axis L becomes perpendicular to the marker board 4 by using the robot vision and the capturing posture of the camera setting, does not become perpendicular to the marker board 4. When the camera 2 is moved in the $z_{Lc}$-axis direction of the local coordinate system Lc which is not perpendicular to the marker board 4, and the marker 45 positioned at the gravity center of the image also moves in the image coordinate system Im.

Here, first, the PC 3 detects the center position of the central marker 45 from each image captured by the camera 2 before and after moving the camera 2 in the $z_{Lc}$-axis direction of the local coordinate system Lc, by the image coordinate system Im. In addition, the PC 3 sets a center coordinate of the marker 45 detected from the image captured by the camera 2 before moving the camera 2 in the $z_{Lc}$-axis direction as ($u_1$, $v_1$), sets a center coordinate of the marker 45 detected from the image captured by the camera 2 after moving the camera 2 in the $z_{Lc}$-axis direction as ($u_2$, $v_2$), and derives inclination indexes $H_x$ and $H_y$ determined by the following expressions (1) and (2).

$$H_x=(u_1-u_2) \tag{1}$$

$$H_y=(v_1-v_2) \tag{2}$$

Next, based on the inclination indexes $H_x$ and $H_y$, the PC 3 corrects the capturing posture of the camera setting regarding the rotation components w and v which consider the $x_6$-axis and the $y_6$-axis fixed to the TCP as the rotation axis, and updates the local coordinate system Lc based on the corrected capturing posture of the camera setting and the rotation angles of the rotation axis members 121 to 126. When the inclination correction of the optical axis is performed, the $z_{Lc}$-axis of the local coordinate system Lc becomes parallel to the optical axis L.

In the inclination correction of the optical axis, the capturing posture of the camera setting is corrected only by the angle determined in advance, the inclination indexes $H_x$ and $H_y$ are derived every time when the camera 2 is rotated only by the angle determined in advance, and processing of comparing the derived inclination indexes $H_x$ and $H_y$ and a default value determined in advance may be repeated until the inclination indexes $H_x$ and $H_y$ become less than the default value. In other words, while moving the camera 2, the capturing posture of the camera setting and the local coordinate system Lc may be gradually corrected. In addition, a correction amount in which the $z_{Lc}$-axis becomes parallel to the optical axis, may be computed based on the inclination indexes $H_x$ and $H_y$.

Next, the PC 3 corrects the capturing posture of the camera setting with respect to the rotation component u which considers the $z_6$-axis of the J6 coordinate system as the rotation axis, so that the marker 45 positioned at the gravity center of the image moves only in the horizontal direction of the image coordinate system Im, by moving the TCP in the $x_{Lc}$-axis direction of the local coordinate system Lc (S6). This will be described in detail as follows.

Figure 10:
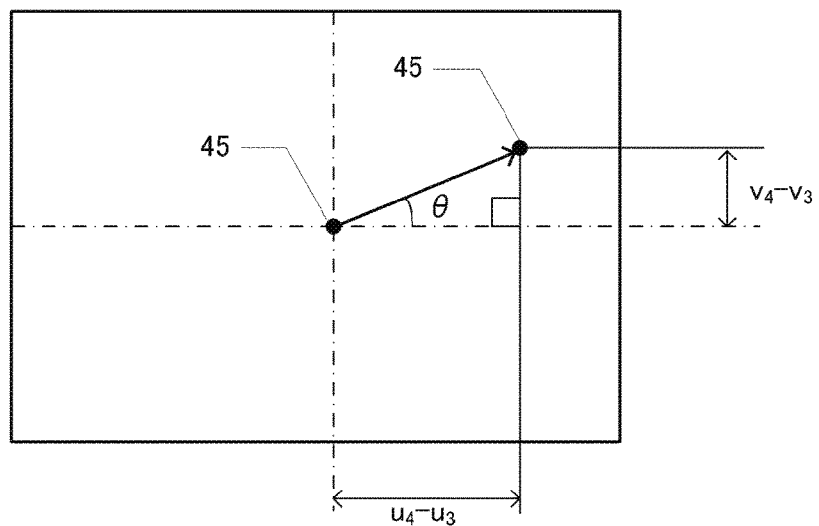
FIG. 10 is a view illustrating an image according to the embodiment of the invention.

First, based on the image captured by the camera 2, the PC 3 moves the camera 2 so that the optical axis L of the camera 2 is perpendicular to the marker board 4, and the central marker 45 is positioned at the gravity center ($u_3$, $v_3$) of the image obtained from the camera 2. Specifically, in a state where the $z_{Lc}$-axis of the local coordinate system Lc updated in step S5 and the $z_{Cam}$-axis of the camera coordinate system Cam are held to be parallel to each other, based on the image captured by the camera 2, the camera 2 is moved so that the center of the marker 45 is positioned at the gravity center of the image. Next, the PC 3 moves the camera 2 only by $\Delta x$ in the $x_{Lc}$-axis direction of the local coordinate system Lc updated in step S5. Next, the PC 3 obtains the image from the camera 2, and detects center positions ($u_4$, $v_4$) of the marker 45 from the obtained image. If the $x_{Lc}$-axis of the local coordinate system Lc is set to be parallel to the $x_{Cam}$-axis of the camera coordinate system Cam, even when the camera 2 moves in the $x_{Lc}$-axis direction, the marker 45 does not move in the perpendicular direction in the image coordinate system Im. However, if the $x_{Lc}$-axis of the local coordinate system Lc is not set to be parallel to the $x_{Cam}$-axis of the camera coordinate system Cam, when the TCP moves in the $x_{Lc}$-axis direction, the marker 45 in the image coordinate system Im moves in the perpendicular direction from the gravity center of the image as illustrated in FIG. 10. Here, a correction angle $\Delta\theta$ which rotates the $x_{Lc}$-axis and the $y_{Lc}$-axis of the local coordinate system Lc around the $z_{Lc}$-axis is derived by the following expression (3), and the $x_{Lc}$-axis and the $y_{Lc}$-axis directions of the local coordinate system Lc and the rotation component u of the camera setting are corrected.

$$\Delta\theta = \arctan\frac{v_4 - v_3}{u_4 - u_3} \quad (3)$$

Next, the PC 3 corrects a $x_6$ component and a $y_6$ component of the camera setting so that the marker 45 positioned at the gravity center of the image does not move in the image coordinate system Im by rotating the camera 2 around the axis parallel to the $z_{Lc}$-axis of the local coordinate system Lc, and updates the local coordinate system Lc (S7).

Figure 11:
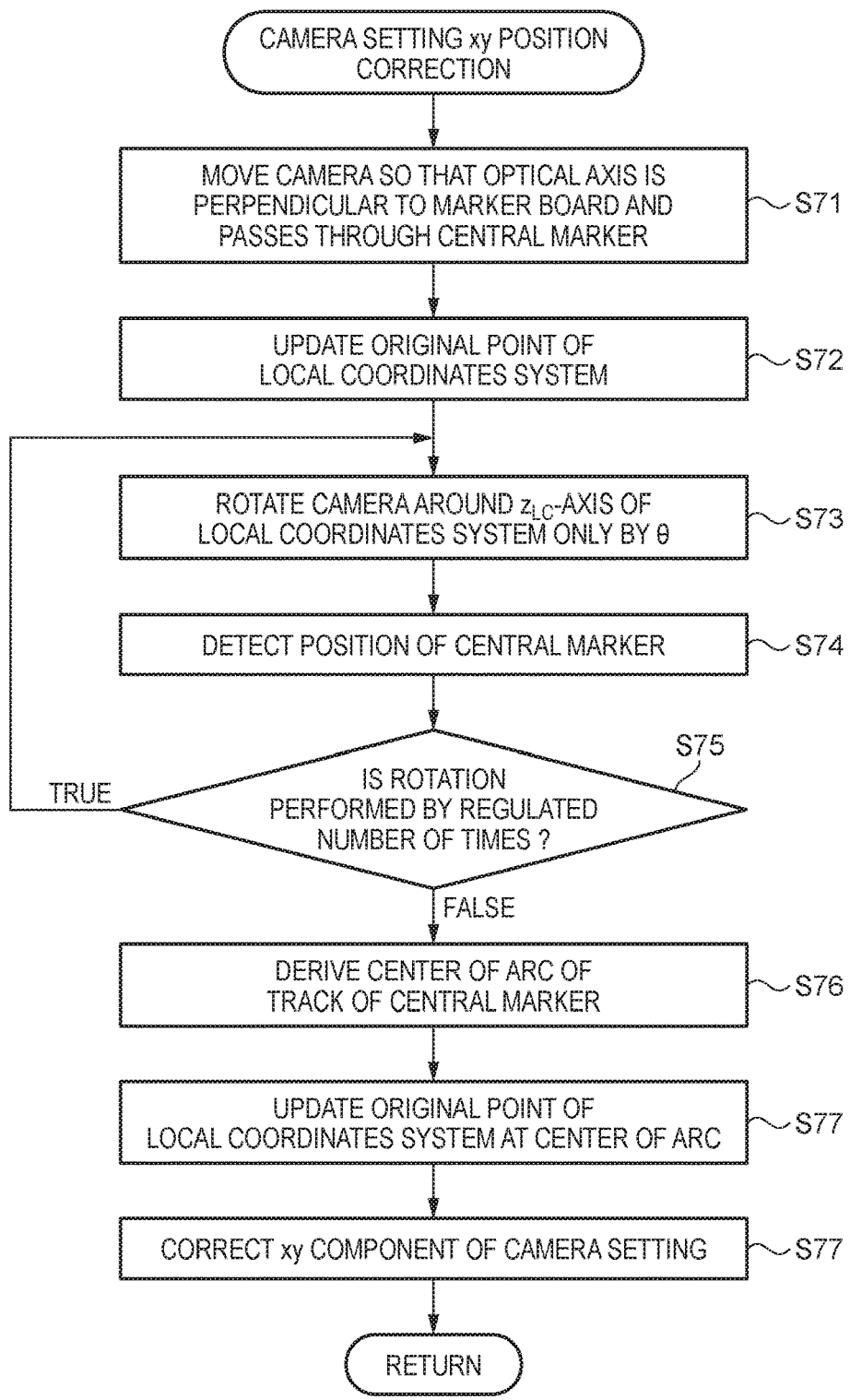
FIG. 11 is a flowchart according to the embodiment of the invention.

Here, the processing of the step S7 will be described in detail based on FIG. 11. First, the PC 3 moves the camera 2 in an initial state where the optical axis L of the camera 2 is perpendicular to the marker board 4 and the central marker 45 is positioned at the gravity center of the image obtained from the camera 2, based on the image captured by the camera 2 (S71). Specifically, the camera 2 is moved so that the $z_{Lc}$-axis of the local coordinate system Lc updated in step S6 and the $z_{Cam}$-axis of the camera coordinate system Cam become parallel to each other, the center of the marker 45 is positioned at the gravity center of the image.

Next, the PC 3 updates the coordinate of the original point of the local coordinate system Lc in the reference coordinate system Rb, based on the position of the TCP after moving and the camera setting (S72). At this point, since the xy components of the camera setting are not corrected, the original point of the local coordinate system Lc is set to a coordinate different from the practical capturing position of the camera 2.

Next, the PC 3 rotates the camera 2 only by a regulated angle θ (for example, 30 degrees) considering the $z_{Lc}$-axis of the local coordinate system Lc as the rotation axis (S73). Since the original point of the local coordinate system Lc is different from the practical capturing position of the camera 2, the camera 2 rotates around the rotation axis that does not pass through the center of the marker 45.

Next, the PC 3 obtains the image from the camera 2 after the rotation, and detects the center position of the central marker 45 from the obtained image (S74). Since the rotation axis does not pass through the center of the marker 45, the center position of the marker 45 after the rotation is detected at the position different from that before the rotation.

Figure 12:
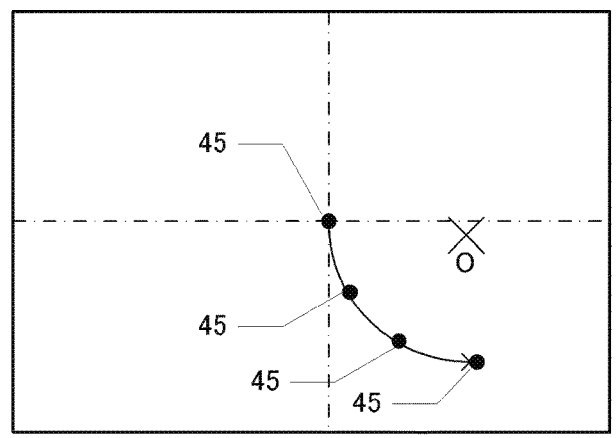
FIG. 12 is a view illustrating an image according to the embodiment of the invention.

Next, the PC 3 determines whether or not the camera 2 is rotated is step S73 only by the regulated number of times (S75). When the camera 2 is not rotated only by the regulated number of times in step S73, the PC 3 repeats the processing after step S73. When the processing of steps S73 and S74 is repeated, the track of the center of the marker 45 is drawn as an arc as illustrated in FIG. 12.

When the camera 2 rotates only by the regulated number of times in step S73, the PC 3 derives a center O ($u_7$, $v_7$) of the arc drawn by the center of the marker 45 by the image coordinate system Im (S76).

Next, the PC 3 performs the updating by moving the local coordinate system Lc parallel to a $x_{Lc}y_{Lc}$ plane in the reference coordinate system Rb so that a point which corresponds to the center O of the arc derived in the image coordinate system Im becomes the original point of the local coordinate system Lc, and corrects the $x_6$ component and the $y_6$ component of the camera setting based on the corresponding relationship between the updated local coordinate system Lc and the reference coordinate system Rb (S77). On this stage where the local coordinate system is not confirmed and the image coordinate system Im and the reference coordinate system Rb are not calibrated, the corresponding relationship between the local coordinate system Lc or the reference coordinate system Rb, and the image coordinate system Im, is not determined. Here, the PC 3 makes the camera 2 advance so that the marker 45 is positioned at the center O of the arc acquired in step S76, and derives the corresponding relationship between the image coordinate system Im and the local coordinate system Lc set in step S72, based on the coordinates before and after moving the marker 45 detected in the image coordinate system Im, and the capturing position (the capturing position determined by the TCP and the camera setting) before and after moving the reference coordinate system Rb. Next, the PC 3 converts the coordinate of the center O of the arc in the image coordinate system Im based on the derived corresponding relationship, into the coordinate of the local coordinate system Lc set in step S72. Next, the PC 3 converts the coordinate of the center O of the arc in the local coordinate system Lc set in step S72 into the reference coordinate system Rb, and derives the new local coordinate system Lc which considers the center O of the arc as the original point. As a result, the local coordinate system Lc set in step S72 moves parallel to the $x_{Lc}y_{Lc}$ plane. In addition, $x_{rb}$ and $y_{rb}$ coordinates of the center O of the arc converted into the reference coordinate system Rb, match the $x_{rb}$ and $y_{rb}$ coordinates of the practical capturing position of the camera 2. Here, the PC 3 corrects the $x_6$ component and the $y_6$ component of the camera setting based on the $x_{rb}$ and $y_{rb}$ coordinates of the center O of the arc and the positional coordinates the TCP.

Next, based on the image captured by the camera 2, the PC 3 corrects a $z_6$ component of the camera setting, and updates the local coordinate system Lc (S8). This will be described in detail as follows.

First, based on the image captured by the camera 2, the PC 3 moves the camera 2 in the initial state where the optical axis L of the camera 2 is perpendicular to the marker board 4 and the central marker 45 is positioned at the gravity center of the image obtained from the camera 2. Specifically, the camera 2 is moved so that the $z_{Lc}$-axis of the local coordinate system Lc updated in step S7 and the $z_{Cam}$-axis of the camera coordinate system Cam are parallel to each other, and the center of the marker 45 is positioned at the gravity center of the image.

Next, the PC 3 updates the coordinate of the original point of the local coordinate system Lc in the reference coordinate system Rb, based on the position of the TCP after moving and the camera setting. At this time, since the $z_6$ component of the camera setting is not corrected, the original point of the local coordinate system Lc is set to the coordinate different from the practical capturing position of the camera 2.

Next, the PC 3 obtains the image from the camera 2 in the initial state, detects the positions of the markers 41 to 49 by the image coordinate system Im, and derives the distance H from the marker board 4 to the capturing position based on the detected positions of the markers 41 to 49 and the positions of the markers 41 to 49 in the marker coordinate system Cb. Here, the relationship between the distance in the image coordinate system Im and the distance in the marker coordinate system Cb, linearly corresponds to the distance H from the marker board 4 to the capturing position. Therefore, the PC 3 derives the distance H based on an inter-marker distance estimated from the positions of the markers 41 to 49 in the image coordinate system Im, and an inter-marker distance estimated from the positions of the markers 41 to 49 in the marker coordinate system Cb.

Figure 13:
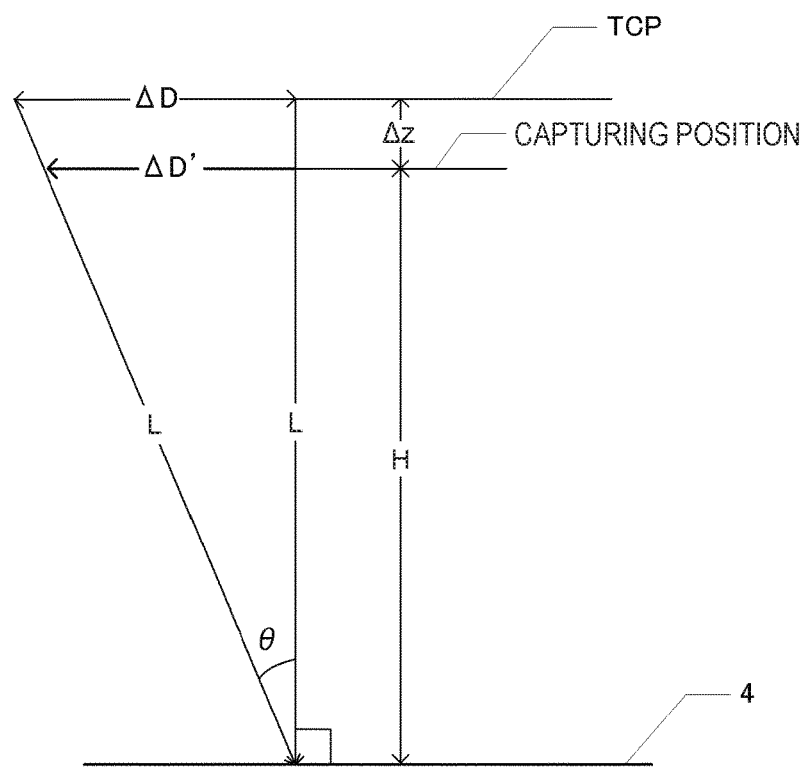
FIG. 13 is a schematic view according to the embodiment of the invention.

Next, as illustrated in FIG. 13, after rotating the camera 2 only by the regulated angle θ around the $x_{Cam}$-axis or the $y_{Cam}$-axis without changing the capturing position, while obtaining the image from the camera 2 and detecting the center position of the marker 45, the PC 3 moves the camera 2 parallel to the $x_{Lc}y_{Lc}$ plane of the local coordinate system Lc until the marker 45 is positioned at the gravity center of the image again, and measures the moving distance ΔD of the TCP. In addition, at this point, the $x_{Cam}$-axis of the camera coordinate system Cam is parallel to the $x_{Lc}$-axis of the local coordinate system Lc, and the $y_{Cam}$-axis of the camera coordinate system Cam is parallel to the $y_{Lc}$-axis of the local coordinate system Lc.

If the $z_6$ component of the camera setting is correctly set to the practical capturing position, the moving distance ΔD of the camera 2 derived from the measured moving distance of the TCP, and the camera setting, and the practical moving distance ΔD' of the camera 2, become equivalent to each other. However, at this time, since the $z_6$ component of the camera setting is not correctly set to the practical capturing position, the position of the TCP and the capturing position derived from the camera setting, are deviated in the $z_{Lc}$ direction (direction perpendicular to the marker board 4) from the practical capturing position. Therefore, as illustrated FIG. 13, the practical moving distance ΔD' of the camera 2 and the moving distance ΔD derived from the position of the TCP and the camera setting, do not become equivalent to each other. The relationship between the distance H, the angle θ, the distance ΔD, and an error Δz of the $z_6$ component of the camera setting, is illustrated by the following expression (4).

$$(H+\Delta z)\tan\theta = \Delta D \qquad (4)$$

Here, the PC 3 derives Δz by the following expression (5), corrects and confirms the $z_6$ component of the camera setting, and updates the local coordinate system Lc based on the current position of the TCP derived from the rotation angles of the rotation shaft members 121 to 126, and the camera setting after correction.

$$\Delta z = \frac{\Delta D}{\tan\theta} - H \qquad (5)$$

The updated local coordinate system Lc considers the practical capturing position of the camera 2 as the original point, and has the $z_{Lc}$-axis which is parallel to the optical axis L of the camera 2, the $x_{Lc}$-axis which is parallel to the horizontal direction of the area image sensor 202, and the $y_{Lc}$-axis which is parallel to the perpendicular direction of the area image sensor 202. In addition, the confirmed camera setting correctly corresponds to the capturing position and the capturing posture of the camera 2.

3. Optical Axis Inclination Correction

Figure 5:
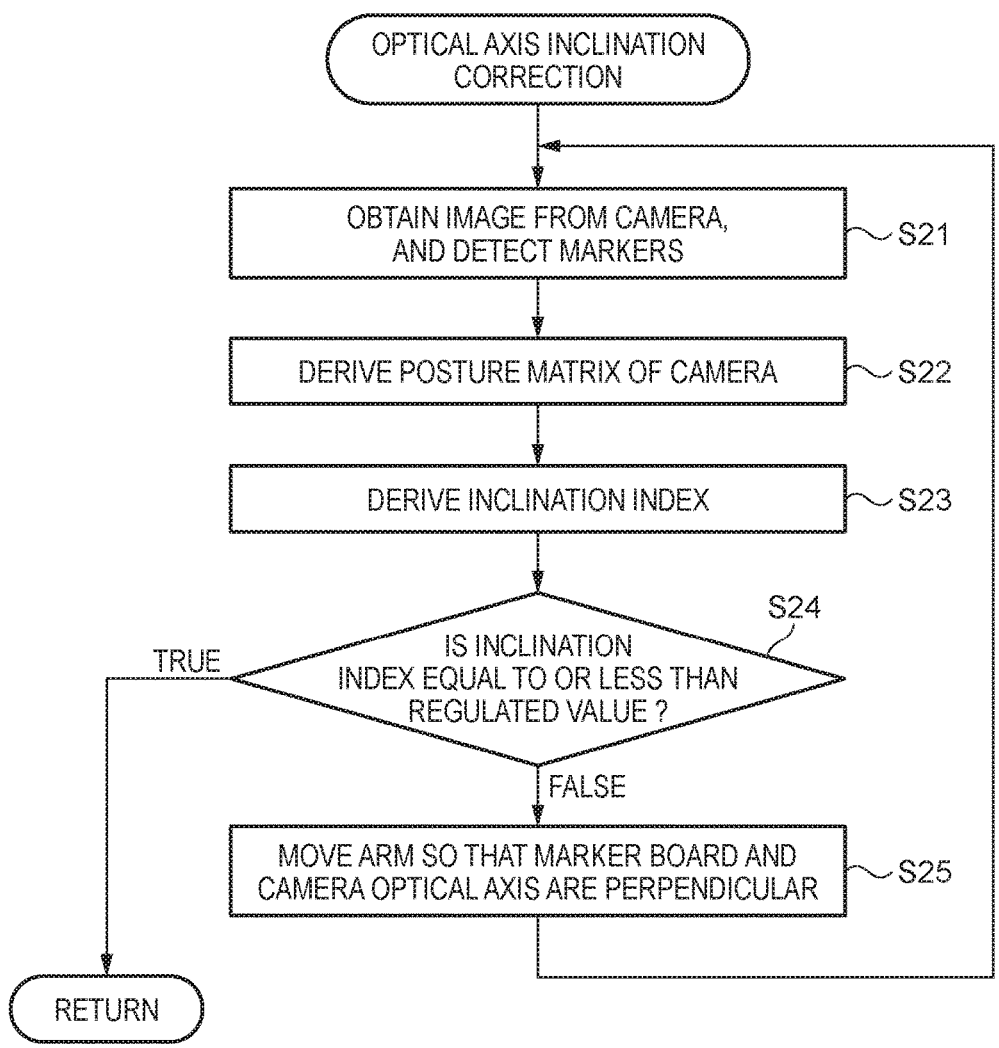
FIG. 5 is a flowchart according to the embodiment of the invention.

Next, the optical axis inclination correction will be described in detail with reference to FIG. 5. In optical axis inclination correction, the practical capturing position of the camera 2 and the capturing direction are corrected by considering the marker board 4 of which the posture and the position are unknown as a reference. Specifically, the capturing position and the capturing posture of the camera 2 with respect to the coordinate system Cb fixed to the marker board 4 are derived, and the posture of the camera 2 is changed so that a $z_{cb}$-axis of the marker coordinate system Cb becomes parallel to the optical axis L of the camera 2.

First, the target value deriving portion 32 obtains the image from the camera 2 via the image obtaining portion 31, and detects the center position of the markers 41 to 49 by interpreting the image (S21). In other words, the target value deriving portion 32 detects the position of nine reference positions included in the work plane in the image coordinate system.

Next, the target value deriving portion 32 derives a posture matrix C illustrating the posture of the camera 2 in the marker coordinate system Cb, based on the center positions of each of the markers 41 to 49 on the marker board 4 determined in advance in the marker coordinate system Cb, and the center position of the markers 41 to 49 detected in the image coordinate system Im (S22). In the posture matrix C illustrated in the expression (6), ($a_{11}$, $a_{21}$, $a_{31}$) is a vector $C_x$ illustrating the direction of the $x_{Cam}$-axis in the marker coordinate system Cb, ($a_{12}$, $a_{22}$, $a_{32}$) is a vector $C_y$ illustrating the direction of the $y_{Cam}$-axis in the marker coordinate system Cb, and ($a_{13}$, $a_{23}$, $a_{33}$) is a vector $C_z$ illustrating the direction of the optical axis L in the marker coordinate system Cb.

$$C = \begin{pmatrix} a_{11} & a_{12} & a_{13} \\ a_{21} & a_{22} & a_{23} \\ a_{31} & a_{32} & a_{33} \end{pmatrix} \quad (6)$$

Next, the target value deriving portion 32 derives the inclination indexes $\theta_x$, $\theta_y$, and $\theta_z$ of the optical axis L, based on the posture matrix C of the camera 2 (S23). $\theta_x$ is an angle made by the $x_{Cam}$-axis and an $X_{cb}$-axis, and $\theta_y$ is an angle made of the $y_{Cam}$-axis and a $y_{cb}$-axis. $\theta_z$ is an angle made by the optical axis L and the $z_{cb}$-axis. In the marker coordinate system Cb, a vector X illustrating the direction of the $X_{cb}$-axis is (1, 0, 0), a vector Y illustrating the direction of the $y_{cb}$-axis is (0, 1, 0), and a vector Z illustrating the direction of the $z_{cb}$-axis is (0, 0, 1).

$$C_x \cdot X = |C_x| \cos \theta_x = a_{11} \quad (7)$$

$$C_y \cdot Y = |C_y| \cos \theta_y = a_{22} \quad (8)$$

$$C_z \cdot Z = |C_z| \cos \theta_z = a_{33} \quad (9)$$

Since the expressions are satisfied, the target value deriving portion 32 derives the inclination indexes $\theta_x$, $\theta_y$, and $\theta_z$ by using the following expressions (10), (11), and (12).

$$\theta_x = a\cos(a_{11}/|C_x|) \quad (10)$$

$$\theta_y = a\cos(a_{22}/|C_y|) \quad (11)$$

$$\theta_z = a\cos(a_{33}/|C_z|) \quad (12)$$

Next, the target value deriving portion 32 determines whether or not all of the inclination indexes $\theta_x$, $\theta_y$, and $\theta_z$ are equal to or less than the regulated value (step S24). The default value is, for example, 0.5 degrees. When all of the inclination indexes $\theta_x$, $\theta_y$, and $\theta_z$ are equal to or less than the regulated value, the optical axis inclination correction is finished.

In a case where all of the inclination indexes $\theta_x$, $\theta_y$, and $\theta_z$ are not equal to or less than the regulated value, based on the inclination indexes derived in step S23, the target value deriving portion 32 derives the target value for moving the camera 2 to the position and the posture in which the marker board 4 is perpendicular to the optical axis L of the camera 2, and the optical axis L passes through the center of the central marker 45. The derived target value is output to the control portion 14 of the robot 1 by the output portion 33. As a result, the arms 111 to 115 move (S25).

When the output portion 33 outputs the target value to the robot 1, and the arms 111 to 115 move and stop, the processing from the above-described step S21 to step S24 in which the image obtaining portion 31 obtains the image from the camera 2, the target value deriving portion 32 derives the inclination index based on the image and evaluates the inclination index, is repeated.

4. Focal Point Adjustment

Figure 6:
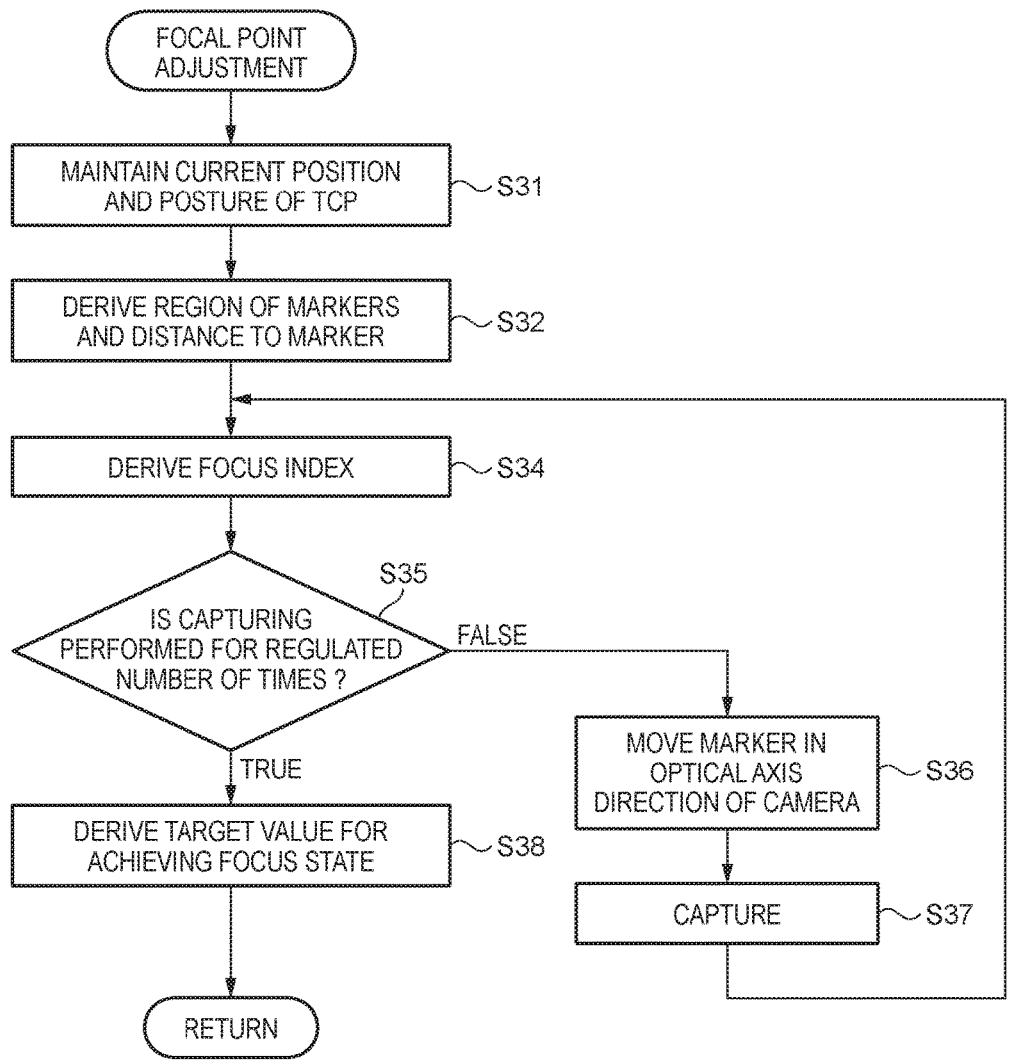
FIG. 6 is a flowchart according to the embodiment of the invention.
Figure 7:
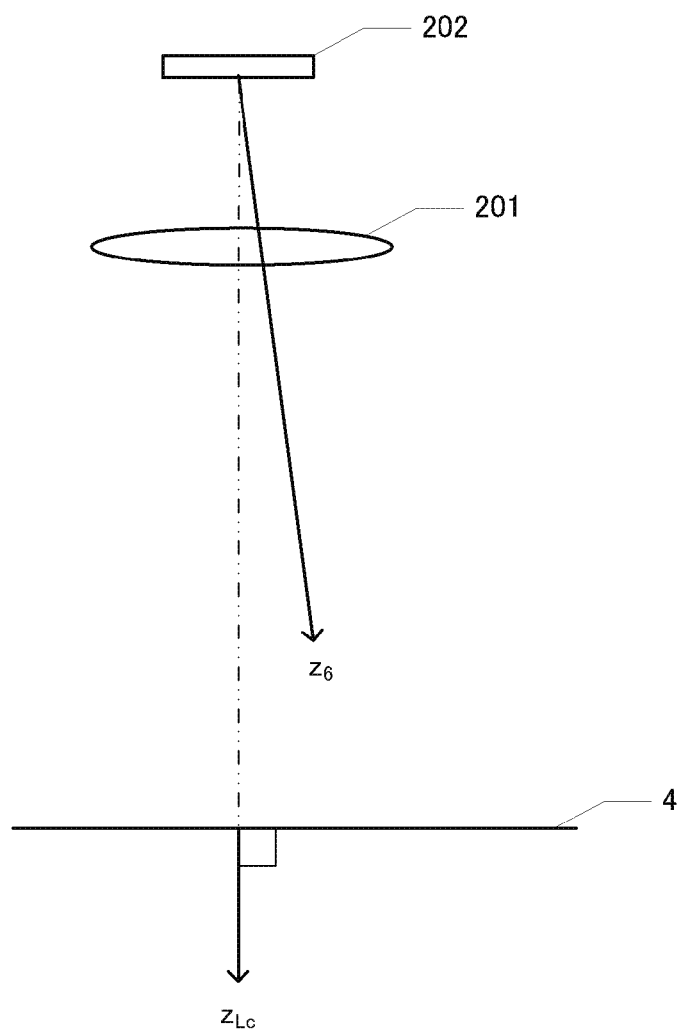
FIG. 7 is a schematic view according to the embodiment of the invention.

Next, the focal point adjustment will be described in detail with reference to FIG. 6. In the focal point adjustment, as illustrated in FIG. 7, the focus state where the sharpness of the markers 41 to 49 reflected on the image becomes the maximum while moving the TCP in the direction parallel to the optical axis L of the camera 2, is searched.

First, the target value deriving portion 32 holds the current position and the posture of the TCP (S31). In other words, the position and the posture of the TCP at the time when the inclination correction of step S2 is finished, is maintained.

Next, the target value deriving portion 32 derives the distance from the camera 2 to the marker board 4 based on the coordinates of each gravity center of the markers 41 to 49 in the marker coordinate system Cb, and the coordinates of each gravity center of the markers 41 to 49 in the image coordinate system (S32).

Figure 8A:
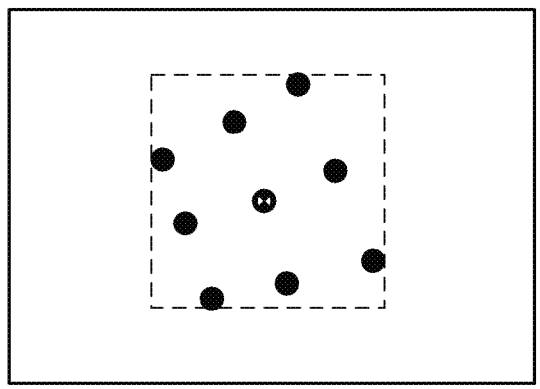
FIGS. 8A to 8C are views illustrating an image according to the embodiment of the invention.
Figure 8B:
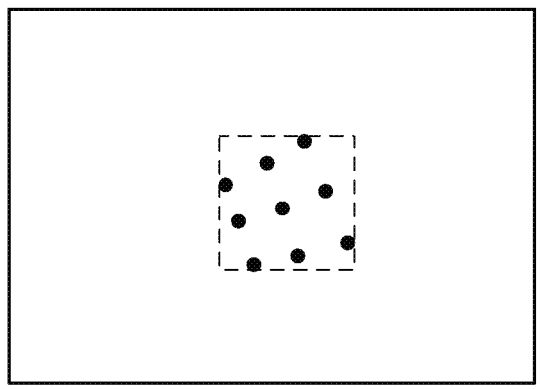

Next, the target value deriving portion 32 derives a focus index of the camera 2 based on the image obtained from the camera 2 (S34). As the focus index, it is possible to use a value made by standardizing a differentiated and integrated value (sharpness) of a region where the markers 41 to 49 are reflected by a constant area. An object region where the focus index is derived is set to be in the minimum rectangular region where all of the markers 41 to 49 are included inside thereof similar to a region surrounded by a dotted line of FIGS. 8A and 8B. In other words, the focus index is derived based on a partial image cut out of the image in which the markers 41 to 49 are captured by the camera 2.

Next, the target value deriving portion 32 determines whether or not the number of capturing by the camera 2 in the focal point adjustment reaches a regulated number (S35).

In a case where the number of capturing by the camera 2 does not reach the regulated number in the focal point adjustment, the target value deriving portion 32 moves the TCP only by the predetermined distance in the direction of approaching or being separated from the marker board 4 parallel to the optical axis L of the camera 2 (S36).

Figure 8C:
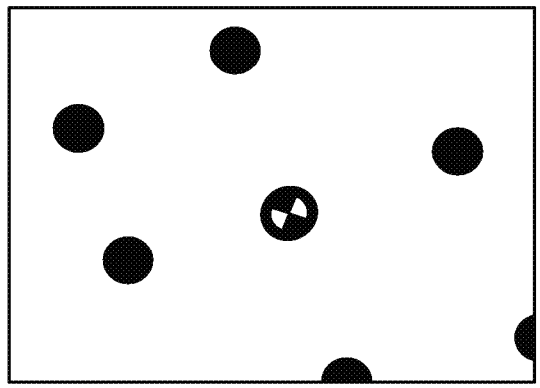

When moving the TCP, the image obtaining portion 31 obtains the image from the camera 2 (S37), and the processing from step S33 is repeated. In other words, the camera 2 performs the capturing while changing the capturing position until the number of capturing reaches the regulated number, and the focus index is derived for every captured image. When approaching the marker board 4, the region where the markers 41 to 49 are reflected increases, and then, the markers 41 to 49 are not included in the image as illustrated in FIG. 8C. Here, the object region where the focus index is derived is set to increase as the camera 2 approaches the marker board 4, and the region where the markers 41 to 49 are reflected becomes the entire image after coming into contact with an end side of the image. When the focus index is derived with respect to the region set in this manner, if the focus index is the sharpness, in general, the focus index gradually decreases after the focus index gradually increases.

When the number of capturing by the camera 2 reaches the regulated number in the focal point adjustment, the target value deriving portion 32 derives the target value for achieving the focus state based on the focus index, and the output portion 33 outputs the derived target value to the robot 1 (S38). Specifically, for example, the target value for moving the TCP to the position obtained by the maximum focus index among the plurality of focus indexes derived in step S34, is derived. When the derived target value is output to the robot 1, the marker board 4 becomes in the focus state with respect to the camera 2.

5. Automatic Setting and Automatic Calibration of Local Coordinate System

In order to set the local coordinate system illustrating the work plane, or to calibrate the reference coordinate system Rb and the image coordinate system Im, in the related art, it is necessary to thoroughly prepare to set a state where the optical axis L of the camera 2 is correctly perpendicular to the work plane, or to correctly teach the position and the posture of the work plane by performing touch-up with respect to the work plane in a posture in which a $J_6$-axis is perpendicular to the work plane. In a case where the work plane is not horizontal, a level of difficulty of the operation of touch-up with respect to the work plane increases. In addition, in a case where the preparation is not correct, the calibration is failed. In addition, as the operator ascertains that the calibration is failed, the operator ascertains that the preparation of the calibration is not correct. Therefore, in the related art, it takes some time to perform the calibration and to set the local coordinate system.

In automatic setting and automatic calibration of the local coordinate system, the calibration and the setting of the local coordinate system are automatically performed by using the robot vision (image captured by the camera 2) in a state where the calibration is not performed. In the preparation for the calibration which is automatically performed, an automatic control in a state where the optical axis of the camera 2 is perpendicular to the marker board 4 illustrating the work plane, and the camera 2 focuses on the marker board 4, is included. Therefore, only by inputting the start instruction in a state where the correct positional relationship between the marker board 4 and the camera 2 is not determined, it is possible to extremely easily calibrate the reference coordinate system Rb and the image coordinate system Im. In addition, in a state where the preparation for the calibration is completed, by setting the local coordinate system Lc, it becomes easy to control the robot 1 by considering the work plane as a reference.

Figure 14:
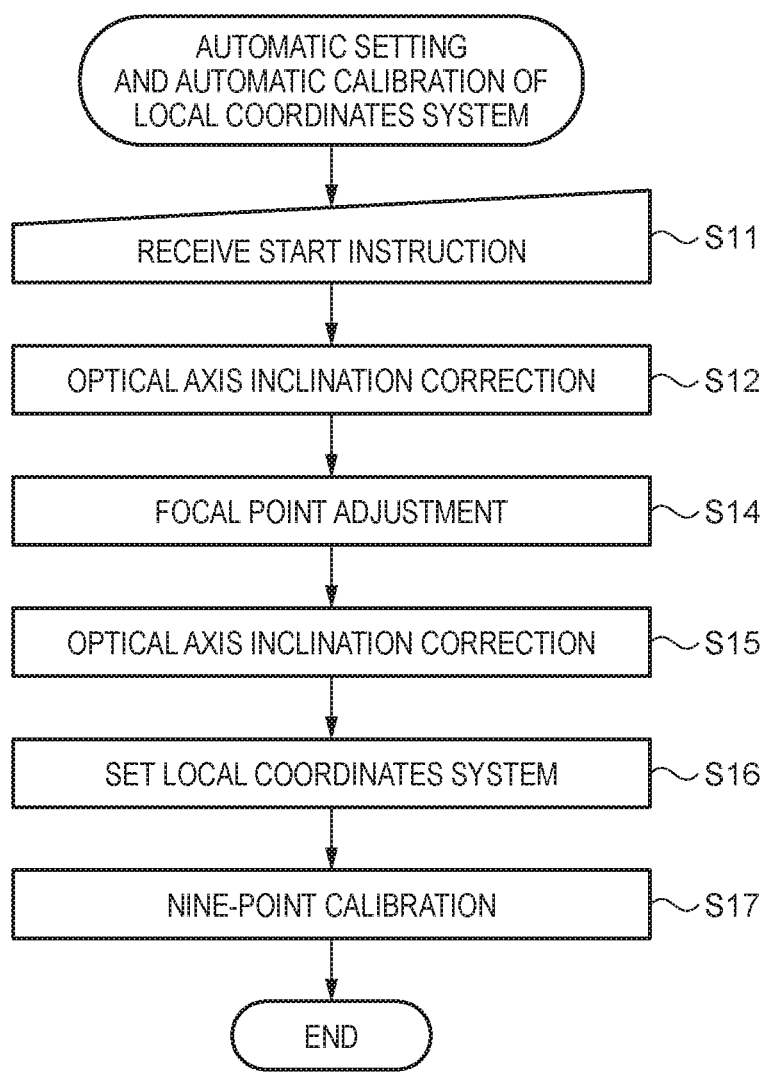
FIG. 14 is a flowchart according to the embodiment of the invention.

Hereinafter, the automatic setting and the automatic calibration of the local coordinate system will be described with reference to FIG. 14. The automatic setting and the automatic calibration of the local coordinate system are initiated as the operator inputs the start instruction to the PC 3 (S11). After this, the preparation may be completed without requiring any operation of the operator. The start instruction is a trigger for starting the automatic setting and the automatic calibration of the local coordinate system. Therefore, the target value for operating the robot 1 may not be included. The only request for the operator before inputting the start instruction may be the setting the camera setting in the PC 3, the installation of the marker board 4 on the work plane, and the jog feeding operation which moves the TCP in a state where the marker board 4 can be captured from a substantially front view by the camera 2.

When the start instruction is input to the PC 3, the PC 3 performs the optical axis inclination correction which makes the optical axis L of the camera 2 perpendicular to the marker board 4 (S12). Next, the PC 3 performs the focal point adjustment (S14). Next, the PC 3 performs the optical axis inclination correction again. Here, the performed optical axis inclination correction and the focal point adjustment are the same as the optical axis inclination correction (S2) and the focal point adjustment (S4) which are described in the automatic camera setting. When the second optical axis inclination correction is performed, the optical axis L of the camera 2 is correctly perpendicular to the marker board 4.

Next, the PC 3 performs the setting of the local coordinate system (S16). Specifically, first, based on the image captured by the camera 2, the PC 3 moves the camera 2 so that the optical axis L of the camera 2 is perpendicular to the marker board 4, and the central marker 45 is positioned at the gravity center of the image obtained from the camera 2. Specifically, from a state where the optical axis inclination correction is performed, the capturing position of the camera 2 advances so that the center of the marker 45 is positioned at the gravity center of the image. Next, the PC 3 sets the local coordinate system Lc based on the position and the posture of the TCP, and the camera setting. Since the camera setting is correct, the local coordinate system Lc which considers the practical capturing position of the camera 2 as the original point, and has the $z_{Lc}$-axis perpendicular to the marker board 4, the $x_{Lc}$-axis parallel to the horizontal direction of the area image sensor 202, and the $y_{Lc}$-axis parallel to the perpendicular direction of the area image sensor 202, is set.

Next, the PC 3 performs 9-point calibration (step S17). At this point, the $x_{Lc}y_{Lc}$ plane of the local coordinate system is parallel to the marker board 4. This means that it is possible to calibrate the local coordinate system Lc and the image coordinate system Im illustrating the work plane, and to configure the reference coordinate system Rb and the image coordinate system Im, based on the positions of the markers 41 to 49 detected from the image.

Specifically, the calibration portion 34 obtains the image from the camera 2 in a state where the local coordinate system Lc is set (a state where the capturing position is positioned at the original point, and xyz axes of the local coordinate system and the camera coordinate system are parallel to each other), and detects and stores the positions of each of the markers 41 to 49 in the image coordinate system Im. Next, the calibration portion 34 converts the center coordinates of the each of the detected markers 41 to 49 into the local coordinate system Lc from the image coordinate system Im, and makes the capturing position of the camera 2 advance so that the centers of each of the markers 41 to 49 is positioned at the gravity center of the image. Next, based on the center coordinates of each of the detected markers 41 to 49 in the image coordinate system Im and the capturing position of the camera 2 in which the centers of each of the markers 41 to 49 are positioned at the gravity center of the image, the calibration portion 34 calibrates the local coordinate system Lc and the image coordinate system Im. In other words, the parameter which indicates the non-linear corresponding relationship between the local coordinate system Lc and the image coordinate system Im, is derived by using the coordinate (coordinate of the capturing position) of the local coordinate system Lc which illustrates the intersection point between a straight line from nine markers 41 to 49 to the $x_{Lc}y_{Lc}$ plane and the $x_{Lc}y_{Lc}$ plane, and the center coordinates of nine markers 41 to 49 detected from the image coordinate system Im in which the central marker 45 is positioned at the gravity center of the image. Here, with respect to an arbitrary point on the work plane, by adding the distortion of the lens 201, the local coordinate system Lc and the image coordinate system Im are correctly calibrated. In addition, the accuracy of the calibration increases as the number of reference points which are used in deriving the parameters used for the non-linear conversion increases. In other words, the accuracy of the calibration increases as the number of markers illustrating the reference points increases. Since the corresponding relationship between the local coordinate system Lc and the reference coordinate system Rb is determined in advance, the reference coordinate system Rb and the image coordinate system Im may be calibrated when calibrating the local coordinate system Lc and the image coordinate system Im, and may not be calibrated. In addition, without calibrating the local coordinate system Lc and the image coordinate system Im, the reference coordinate system Rb and the image coordinate system Im may be calibrated.

6. Target Setting

Figure 15:
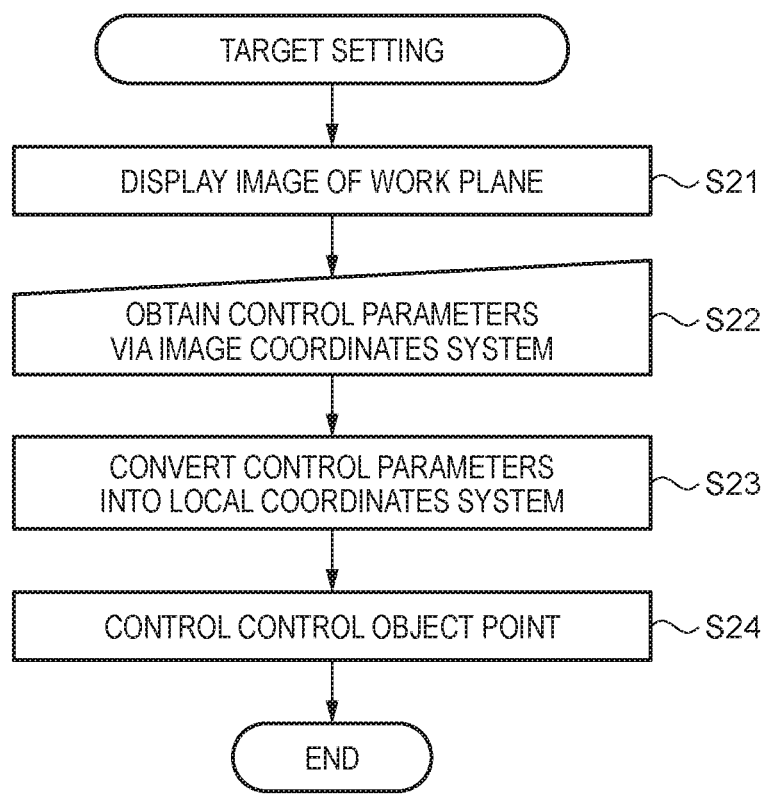
FIG. 15 is a flowchart according to the embodiment of the invention.

In a state where the local coordinate system Lc is set with respect to the work plane, and the local coordinate system Lc or the reference coordinate system Rb, and the image coordinate system Im are calibrated, even if the work plane is not horizontal, it is possible to easily teach the robot 1 the arbitrary point on the work plane. Hereinafter, a target setting which teaches the robot 1 the arbitrary point on the work plane will be described with reference to FIG. 15. In a state where the automatic setting and the automatic calibration of the local coordinate system Lc with respect to the work plane are performed, since the corresponding relationship between the arbitrary point on the work plane and the arbitrary point of the image coordinate system Im are clear, the target setting can be performed in a state where the marker board 4 is removed from the work plane.

First, the PC 3 obtains the image of the work plane from the camera 2, and displays the image on the screen (S21). Specifically, the PC 3 sets the capturing position at the original point of the local coordinate system Lc, sets the capturing posture in which the $x_{Lc}$-axis, the $y_{Lc}$-axis, the $z_{Lc}$-axis of the local coordinate system Lc are respectively parallel to the $x_{Cam}$-axis, the $y_{Cam}$-axis, the $z_{Cam}$-axis of the camera coordinate system Cam, instructs the capturing to the camera 2, and accordingly, obtains the image from the camera 2, and displays the obtained image on the screen of the display portion 35.

Next, the PC 3 obtains the control parameters for controlling the control object point, such as the TCP or the tip end of tool via the image coordinate system Im (S22). Specifically, for example, the instruction receiving portion 30 (control parameter obtaining portion) receives an operation of clicking or tabbing with respect to the arbitrary point of the displayed image, as a designation of the position of the target point which moves the control object point. In other words, the PC 3 obtains the coordinate of the target point as the control parameter via the image coordinate system Im. At this time, the PC 3 may receive the designation of the target posture in association with the designation of the target point. For example, the target posture may be designated by directly inputting the numerical values or by operating the slider with respect to the designated target point. The target posture can be designated by designating the direction of at least one shaft of the coordinate system which determines the posture of the control object point in the local coordinate system Lc. In addition, in a case where the designation of the target posture is not performed, the posture which is determined in advance may be considered as the target posture. For example, in a case where the control object point is the tip end of the drill bit mounted on the TCP, the posture in which the rotation axis of the drill bit is perpendicular to the work plane, that is, the posture in which the rotation axis of the drill bit is parallel to the $z_{Lc}$-axis of the local coordinate system Lc, may be considered as the target posture.

Next, the PC 3 converts the coordinate of the target point into the local coordinate system Lc (S23). In other words, the PC 3 obtains the control parameter in step S22 as a parameter in which the arbitrary point in the image displayed on the screen corresponds to a certain point of the local coordinate system Lc. Therefore, here, the position of the target point and the target posture are obtained by the PC 3 as the control parameters via the local coordinate system Lc. In coordinate conversion, the parameters acquired by the automatic calibration is used.

Next, the PC 3 controls the control object point by using the control parameters converted into the local coordinate system Lc (S24). At this time, after the control parameters are converted into the coordinate illustrating the position in the reference coordinate system Rb and the matrix or the angle illustrating the posture in the reference coordinate system Rb by the PC 3, and are output to the robot 1, the rotation angles of the motors 131 to 136 which drive the rotation shaft members 121 to 126 are converted by the control portion 14 of the robot 1. The control portion 14 moves the TCP in the target posture to the target point on the work plane by rotating the motors 131 to 136.

In addition, practically, it is necessary to notify the PC 3 that the input operation of the control parameters is finished, for example, by requiring the user to input a command of a performance start after receiving the input of the control parameters. For example, a button of performance start is displayed on the screen, and in a case where the button is clicked, the processing of step s23 may be started. In addition, it is possible to receive the settings of plurality of target points one time.

In a case where the control object point is moved, a path from a starting point to the target point may be determined in any manner, but, for example, a moving mode in the direction parallel to the work plane and a moving mode in the direction perpendicular to the work plane may be combined so that a switching number of the mode becomes the minimum number. In this manner, in a case where the movement in the direction parallel to the work plane and the movement in the direction perpendicular to the work plane are combined and the control object point is moved, since the control parameters are obtained via the local coordinate system Lc, it is easy to design of the calculation algorithm in the moving direction. In addition, in this case, the user can easily predict a moving path of the control object point.

In addition, in a case where the control object point is set in the tool, the PC 3 obtains the target point and the target posture of the control object point, such as the tip end of the tool via the image coordinate system Im. In this case, it is necessary to set the offset of the tool with respect to the TCP in advance. In order to control the control object point, such as the tip end of the tool, the PC 3 the converts the coordinate of the target point of the control object point set by the user into the coordinate of the TCP in the reference coordinate system Rb by using the offset, and performs the processing of converting the target posture of the control object point set by the user into the target posture of the TCP in the reference coordinate system. Rb by using the offset, and outputs the target posture to the robot 1. The control portion 14 of the robot 1 derives the rotation angles of the motors 131 to 136 which drive the rotation shaft members 121 to 126 based on the coordinate, and the posture matrix or the angle of the reference coordinate system Rb.

In the target setting described above, the user can easily designate the target point on the work plane only by designating a point in the image even when the work plane is not horizontal. In addition, since the work plane is illustrating by the image captured by the camera 2, the user can recognize by easily associating the practical arbitrary point of the work plane with the point in the image displayed on the screen.

In addition, in a case where the designation of the target posture is received, since the target posture is obtained via the local coordinate system Lc having the $x_{Lc}y_{Lc}$ plane parallel to the work plane, even when the work plane is not horizontal, it is possible to easily designate the target posture by associating the target posture with respect to the practical work plane by the user who designates the target posture while seeing the image in which the work plane parallel to the $x_{Lc}y_{Lc}$ plane is captured by the camera 2 from the perpendicular direction.

7. Another Embodiment

In the above-described embodiment, a configuration in which the camera 2 is attached to the arm of the robot 1 is described. In the configuration in which the camera 2 is attached to the arm of the robot 1, it is possible to set the local coordinate system by moving the camera 2 to the arbitrary position with respect to the work plane, and to operate the robot 1 by considering the set local coordinate system as a reference. In other words, in the configuration in which the camera 2 is attached to the arm of the robot 1, it is possible to set the local coordinate system at every capturing position with respect to the work plane.

The invention can be employed in a robot system in which the camera 2 is installed on the work bench, a wall, a floor, or a ceiling. In a configuration in which the camera 2 is installed on the work bench, the wall, the floor, or the ceiling, when the work plane is set, since the positional relationship between the camera 2 and the work plane does not change, one local coordinate system with respect to the work plane is set.

Figure 16:
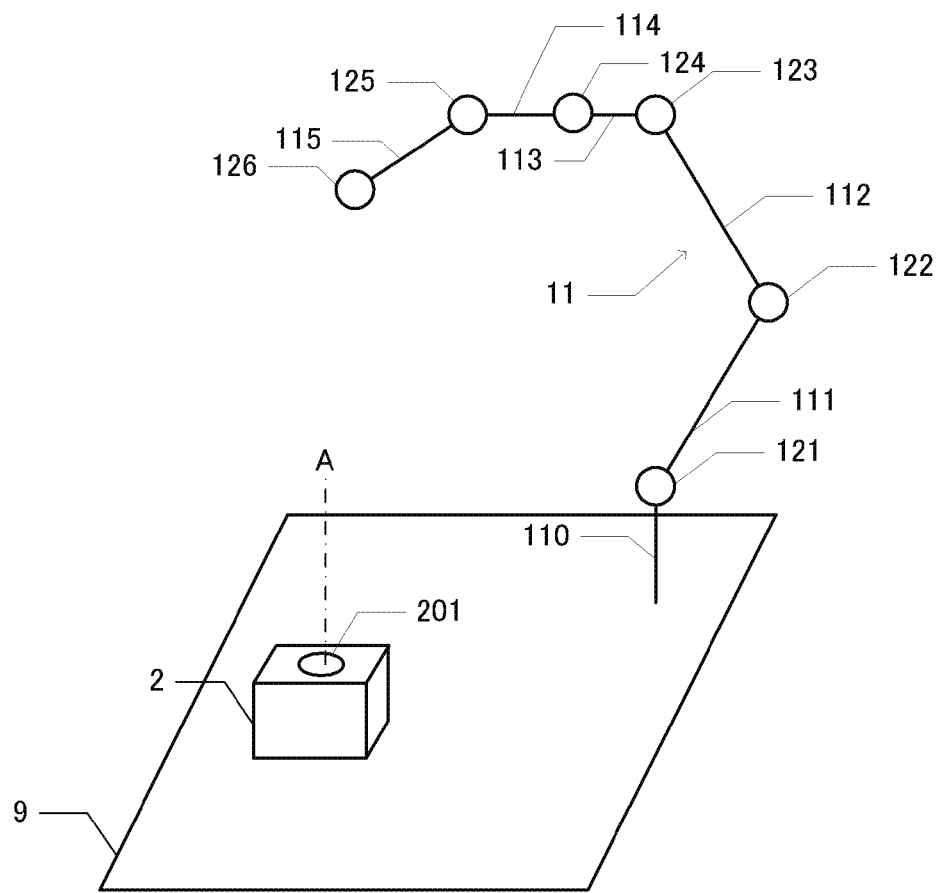
FIG. 16 is a schematic perspective view according to the embodiment of the invention.

As illustrated in FIG. 16, in a case where the camera 2 is installed on a work bench 9, it is possible to set the work plane without using the marker board, and to perform the automatic setting and the automatic calibration of the local coordinate system with respect to the set work plane. Hereinafter, in a case where the camera 2 is installed on the work bench 9, a method for setting the work plane without using the marker board and performing the automatic setting and the automatic calibration of the local coordinate system, will be described. In a case where the marker board is not used, the plurality of reference points on the work plane may be indicated by the manipulator of the robot 1. Specifically, the tool chuck 1261 is used as the marker for indicating the reference points. Therefore, a template for image-recognizing an end surface of the tool chuck 1261 illustrated in FIG. 2A, is stored in the PC 3 in advance.

Figure 17:
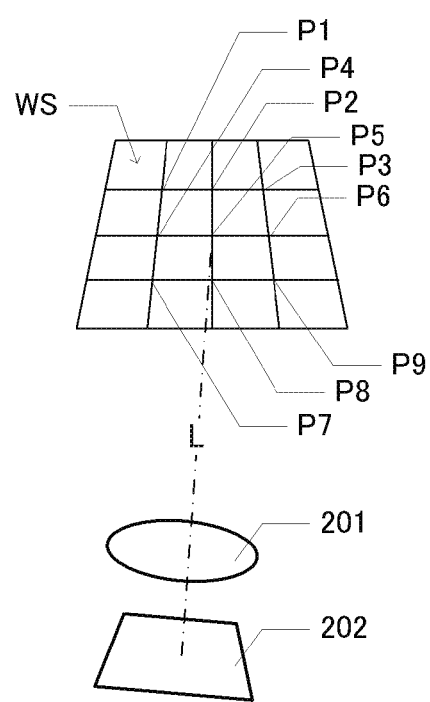
FIG. 17 is a schematic perspective view according to the embodiment of the invention.
Figure 18:
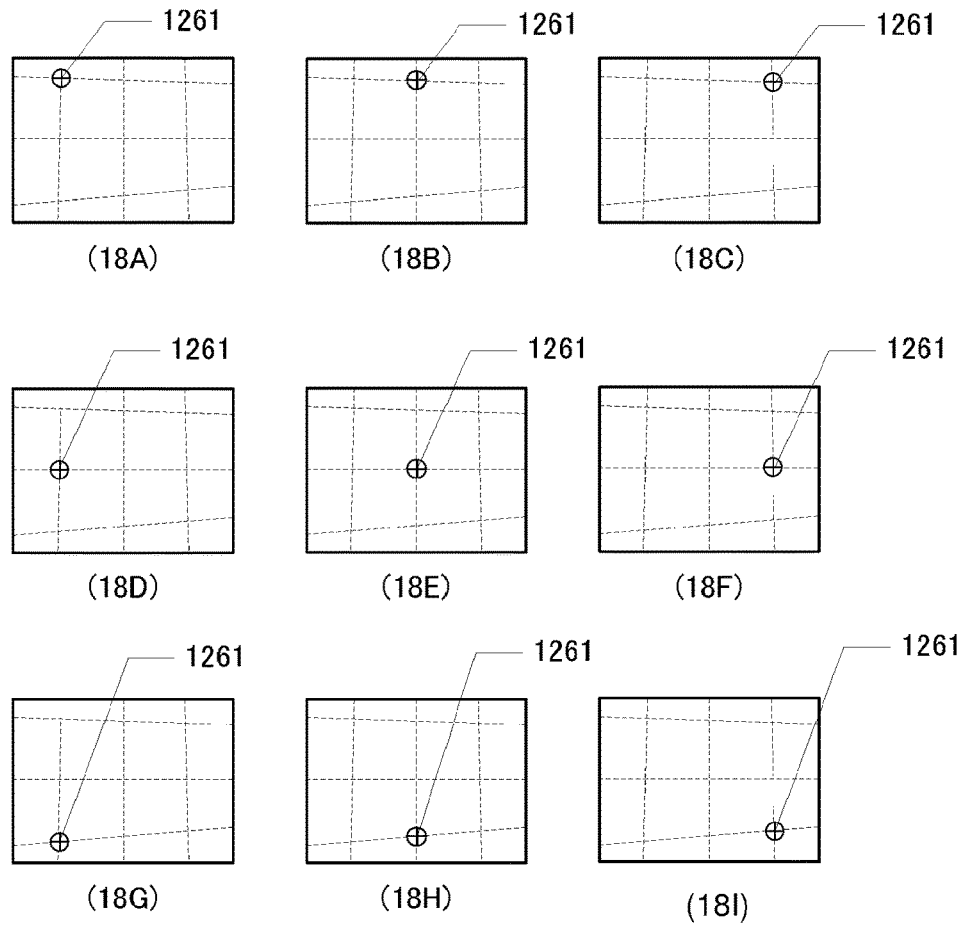
FIGS. 18A to 18I are views illustrating images according to the embodiment of the invention.

When the work plane is set, the PC 3 moves the TCP of the tool chuck 1261 to each of the plurality of reference points on the work plane in a posture in which the J6-axis is perpendicular to the work plane. Here, as illustrated in FIG. 17, reference points P1 to P9 are set with respect to a work plane WS. In addition, the PC 3 obtains the image from the camera 2 which is captured in a state where the TCP is positioned at each reference point, and detects the positions of the reference points P1 to P9 in the image coordinate system Im.

Here, the image captured by the camera 2 will be described by using FIGS. 18A to 18I. When the tool chuck 1261 is captured by the camera 2 every time when the TCP which serves as a marker is moved to nine reference points P1 to P9, the position of the tool chuck 1261 in each image obtained from the camera 2 varies in accordance with the positions of the reference points P1 to P9. Positional information of the reference point obtained from n images in which each of the reference points is captured by the camera 2 fixed in the reference coordinate system Rb by moving the TCP to each reference point set on the work plane by the reference coordinate system Rb, is substantially the same as information of the reference point obtained from one image in which the markers are captured in a state where the marker board on which the markers illustrating n reference points are marked is maintained at a certain point and in a certain posture. In the former information, the exact corresponding relationship between the reference coordinate system and the image coordinate system is reflected, and in the latter information, the corresponding relationship between the coordinate system in which the reference coordinate system and the marker coordinate system are combined, and the image coordinate system, is reflected. Since the reference coordinate system and the marker coordinate system are not limited to the strictly linear relationship, it is preferable to use the former information in strictly calibrating the reference coordinate system and the image coordinate system.

Instead of detecting the position of the marker in the image coordinate system Im by installing the marker board on the work plane, if the positions of the reference points P1 to P9 are detected in the image coordinate system Im by moving the markers on the work plane, it is possible to similarly realize any of the automatic camera setting, the automatic calibration, and the target setting which are described above. However, since the work plane is determined by the reference points, the local coordinate system Lc illustrating the work plane is not set based on the image captured by the camera 2, and is determined in advance. Therefore, when the markers, such as the TCP, are moved, the markers are controlled via the local coordinate system Lc determined in advance.

Above, the points on the $x_{Lc}y_{Lc}$ plane of the local coordinate system Lc are associated with the points on the work plane, but the points on the $x_{Lc}y_{Lc}$ plane of the local coordinate system Lc may be associated with the points on the plane which is parallel to the work plane and is separated from the work plane. For example, as described above, after installing the marker board on the work plane and setting the local coordinate system Lc, the original point of the local coordinate system Lc may be moved in the $z_{Lc}$-axis direction, and the local coordinate system Lc may be updated.

In addition, the distance from the work surface to the $x_{Lc}y_{Lc}$ plane of the local coordinate system Lc may be derived based on the interval between the markers in the marker coordinate system and the interval between the markers in the image coordinate system Im, by detecting two or more markers of which the interval in the marker coordinate system is known in the image coordinate system Im, and the distance from the work surface to the $x_{Lc}y_{Lc}$ plane of the local coordinate system Lc may be derived by measuring the moving distance of the TCP in the process of touch-up of the work plane by the TCP or the tool.

The entire disclosure of Japanese Patent Application No. 2015-111972, filed Jun. 2, 2015 is expressly incorporated by reference herein.

What is claimed is:

1. A robot comprising:
   plurality of arms connected via a joint;
   a motor that is configured to move the joint so that one of the plurality of arms moves relative to another of the plurality of arms;
   a plurality of markers that are located on the work plane;
   a work plane defining an extending plane, the extending plane from the work plane being along a non-horizontal plane;
   a camera that is configured to capture a first image including the markers when a positional relationship between the markers and the camera is in a first state, the camera being disposed on one of the plurality of arms;

a memory that is configured to store computer-readable instructions; and a processor that is configured to execute the computer-readable instructions so as to:

obtain a local coordinate system based on positions of at least three of the markers in the first image, the local coordinate system having a first axis and a second axis perpendicular to each other, the first and second axes being parallel to the work plane;

obtain a control parameter via the local coordinate system;

move one of the plurality of arms so that the positional relationship between the markers and the camera is in a second state that is different from the first state;

cause the camera to capture a second image including the markers when the positional relationship between the markers and the camera is in the second state; and perform calibration of the local coordinate system by comparing the first and second images with respect position differences of the markers, wherein the work plane and an optical axis of the camera are perpendicular to each other when the camera captures the first and second images.

2. The robot according to claim 1, wherein the control parameter is a coordinate of a target point to which a control object point moves, and the control object is provided at one of the plurality of arms.

3. The robot according to claim 2, further comprising:

the processor is configured to move the control object point parallel to the work plane.

4. The robot according to claim 2, wherein the processor is configured to convert a coordinate of a third image in which the work plane is captured by the camera into a coordinate of the local coordinate system as the target point based on an input by an operator.

5. The robot according to claim 4, wherein the processor is configured to obtain the control parameter based on the coordinate of the third image and the local coordinate system.

6. The robot according to claim 1, wherein the control parameter is a posture of a tool mounted on one of the plurality of arms.

7. A robot control device which controls a robot, the robot control device comprising:

a memory that is configured to store computer-readable instructions; and a processor that is configured to execute the computer-readable instruction so as to:

cause a camera to capture a first image, the first image including a plurality of markers on a work plane defining an extending plane that extends from the work plane along a non-horizontal plane, wherein the first image is captured when a positional relationship between the markers and the camera is in a first state, the camera being disposed on one of a plurality of arms of the robot;

obtain a local coordinate system based on positions of at least three of the plurality of makers in the first image, the local coordinate system having a first axis and a second axis perpendicular to each other, the first and second axes being parallel to the work plane;

obtain a control parameter via the local coordinate system;

move one of the plurality of arms so that positional relationship between the markers and the camera is in a second state that is different from the first state;

cause the camera to capture a second image including the markers when the positional relationship between the markers and the camera is in the second state; and perform calibration of the local coordinate system by comparing the first and second images with respect position differences of the markers, wherein the work plane and an optical axis of the camera are perpendicular to each other when the camera captures the first and second images.

* * * * *